US012786528B2

(12) United States Patent
Croly et al.

(10) Patent No.: US 12,786,528 B2
(45) Date of Patent: Nov. 3, 2026

(54) LONG FORM VIDEO TO SHORT CLIPS

(71) Applicant: ADOBE INC., San Jose, CA (US)

(72) Inventors: Rebecca Louise Croly, Colchester (GB); Hanieh Deilamsalehy, Issaquah, WA (US); Stephen Joseph DiVerdi, Berkeley, CA (US); Lubomira Assenova Dontcheva, Seattle, WA (US); Dingzeyu Li, Sammamish, WA (US); Zhengyang Ma, Redwood City, CA (US); Manas Singh, Noida (IN); Rohit Suri, Noida (IN); Emelie Olga Johanna Swerre, Hove (GB); Anh Lan Truong, New York, NY (US); Pamela Zoni, London (GB)

(73) Assignee: ADOBE INC., San Jose, CA (US)

(*) Notice: Subject to any disclaimer, the term of this patent is extended or adjusted under 35 U.S.C. 154(b) by 0 days.

(21) Appl. No.: 18/916,527

(22) Filed: Oct. 15, 2024

(65) Prior Publication Data

US 2026/0107045 A1 Apr. 16, 2026

(51) Int. Cl.

*H04N 21/8549* (2011.01)
*G10L 15/183* (2013.01)
*H04N 21/234* (2011.01)
*H04N 21/845* (2011.01)
*G10L 25/60* (2013.01)

(52) U.S. Cl.

CPC ....... *H04N 21/8549* (2013.01); *G10L 15/183* (2013.01); *H04N 21/234* (2013.01); *H04N 21/8456* (2013.01); *G10L 25/60* (2013.01)

(58) Field of Classification Search

CPC ............. H04N 21/8549; H04N 21/234; H04N 21/8456; G10L 15/183; G10L 25/60
USPC .......................................................... 725/116
See application file for complete search history.

(56) References Cited

U.S. PATENT DOCUMENTS

| | | | | |
|---|---|---|---|---|
| 11,470,279 | B1 * | 10/2022 | Huang | G06F 40/289 |
| 12,482,499 | B1 * | 11/2025 | Samal | G06F 40/35 |
| 2013/0089304 | A1 * | 4/2013 | Jiang | G06V 20/41 386/285 |
| 2017/0169813 | A1 * | 6/2017 | Suzuki | G10L 15/197 |
| 2017/0330363 | A1 * | 11/2017 | Song | G06N 3/045 |
| 2019/0278978 | A1 * | 9/2019 | Park | G06F 16/7834 |
| 2020/0066305 | A1 * | 2/2020 | Spence | G11B 27/036 |
| 2020/0126583 | A1 * | 4/2020 | Pokharel | G10L 15/1822 |
| 2020/0143704 | A1 * | 5/2020 | Liao | G06F 40/58 |
| 2020/0159833 | A1 * | 5/2020 | Natesan | G10L 21/10 |
| 2021/0201038 | A1 * | 7/2021 | Xia | G11B 27/031 |
| 2021/0304628 | A1 * | 9/2021 | Chen | G06N 3/09 |
| 2022/0076026 | A1 * | 3/2022 | Walker | G06V 40/161 |
| 2022/0215052 | A1 * | 7/2022 | Chalana | G06N 3/08 |

(Continued)

*Primary Examiner* — Sahar Aqil Riaz
(74) *Attorney, Agent, or Firm* — CHAU & ASSOCIATES, LLC

(57) ABSTRACT

A method, apparatus, non-transitory computer readable medium, and system for generating a video clip includes obtaining an input video and a transcript of the input video, wherein the transcript comprises a plurality of sentences. In some cases, a language model is configured to generate a subset of the plurality of sentences based on the transcript. Additionally, the language model generates a video clip based on the input video and a subset of the plurality of sentences, wherein the video clip comprises a portion of the input video.

19 Claims, 12 Drawing Sheets

(56) References Cited

U.S. PATENT DOCUMENTS

| | | | | |
|---|---|---|---|---|
| 2023/0134118 | A1* | 5/2023 | Sehremelis | G06Q 20/085<br>705/66 |
| 2023/0309883 | A1* | 10/2023 | Dhillon | G16H 40/67<br>600/300 |
| 2024/0020977 | A1* | 1/2024 | Wu | G10L 17/14 |
| 2024/0127855 | A1* | 4/2024 | Dontcheva | G11B 27/02 |
| 2024/0135973 | A1* | 4/2024 | Bai | G11B 27/031 |
| 2025/0039336 | A1* | 1/2025 | Lee | H04N 7/155 |
| 2025/0139472 | A1* | 5/2025 | Ephrath | G06N 20/00 |
| 2025/0140292 | A1* | 5/2025 | Truong | G10L 15/183 |
| 2025/0190503 | A1* | 6/2025 | Lee | G06F 16/9535 |
| 2026/0031082 | A1* | 1/2026 | Nardi | G10L 15/083 |
| 2026/0094603 | A1* | 4/2026 | Shah | G06F 40/35 |

* cited by examiner

LONG FORM VIDEO TO SHORT CLIPS

BACKGROUND

The following relates generally to natural language processing apparatus, and more specifically to video clip generation using a machine learning model. Machine learning algorithms build a model based on sample data, known as training data, to make a prediction or a decision in response to an input without being explicitly programmed to do so. One area of application for machine learning is video editing.

For example, a machine learning model may generate short clips of a video by selecting important moments from the video that the machine learning model predicts to be representative of an aspect of the video. In some cases, a prompt can be used to perform a complex manipulation of a video. In some cases, editing systems provide for a user to edit a video and generate a short video with desired content and therefore makes video editing easier for a layperson.

SUMMARY

The present disclosure describes systems and methods for video processing, more specifically for video to snippet generation. According to an example, a natural language processing apparatus of the present disclosure includes a large language model to generate a representation of the input video and uses the representations to generate the snippets. In some cases, the language model incorporates a user-provided input prompt to generate short clips (e.g., snippets) for the input video based on a duration information provided in the input prompt. In some cases, the language model ranks each short clip based on computing a score.

A method, apparatus, and non-transitory computer readable medium for natural language processing are described. One or more aspects of the method, apparatus, and non-transitory computer readable medium include obtaining an input video and a transcript of the input video, wherein the transcript comprises a plurality of sentences; generating, using a language model, a subset of the plurality of sentences based on the transcript; and generating a video clip based on the input video and a subset of the plurality of sentences, wherein the video clip comprises a portion of the input video.

A method, apparatus, and non-transitory computer readable medium for natural language processing are described. One or more aspects of the method, apparatus, and non-transitory computer readable medium include obtaining a transcript of an input video, wherein the transcript comprises a plurality of sentences; generating, using a language model, a plurality of subsets of the plurality of sentences based on the transcript; scoring each of the plurality of subsets to obtain a plurality of video clip scores, respectively; and ranking, using the language model, the plurality of subsets based on the plurality of video clip scores to obtain a video clip ranking.

DETAILED DESCRIPTION

Figure 1:
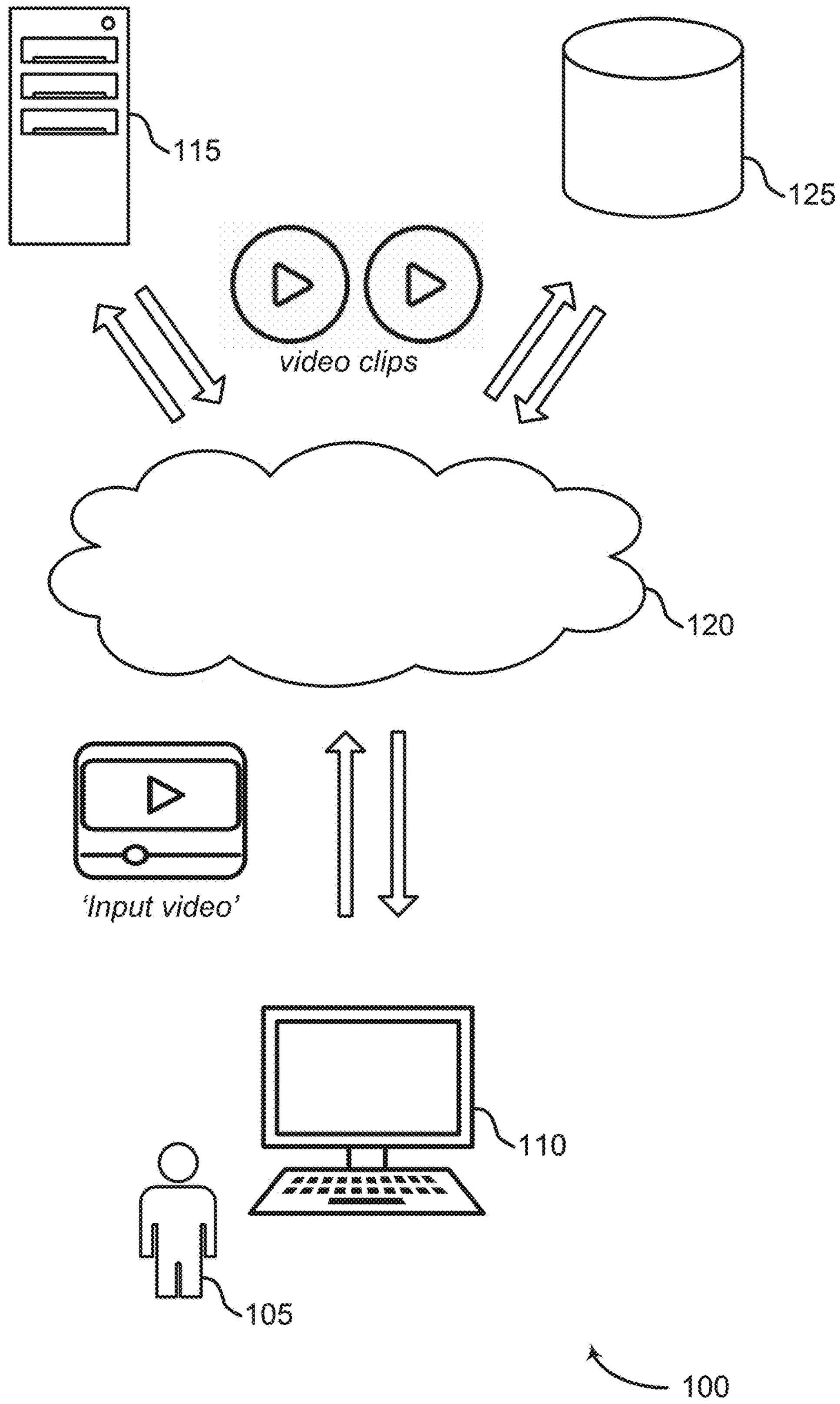
FIG. 1 shows an example of a natural language processing system according to aspects of the present disclosure.

With the exponential growth of digital content, particularly long-form videos on platforms such as YouTube, streaming services, and social media, there is an increasing demand for tools that can efficiently extract these videos into shorter, more consumable clips. Long-form videos often contain valuable segments that users may wish to view, share, or repurpose, but manually identifying and editing these segments is time-consuming and requires specialized skills. As a result, there is a need for automated systems that can intelligently analyze long-form videos and generate short clips while preserving the essence, relevance, and quality of the original content.

Existing methods for video editing often lack accuracy or fail to capture the key highlights of the video, leading to poor user experiences. Additionally, existing video editing systems are constrained by a relatively small amount of existing training data. For example, conventional video editing systems only focus on videos, i.e., such systems do not provide for users to create short videos (e.g., snippets) from a long duration video. Additionally, since such systems are trained using relatively small datasets, they result in a tendency to overfit to available training examples. Accordingly, these systems lack an ability to make desirable extractions of a long-form video for generation of video clips. Therefore, there is a need in the art for a video processing system that can perform automatic video extraction.

By contrast, the present disclosure describes systems and methods that utilize advanced algorithms to automatically process long-form videos and generate short clips based on customizable criteria such as user preferences, video content, or engagement data. Embodiments of the present disclosure include a natural language processing apparatus configured to implement a large language model. In some cases, the language model incorporates an input prompt based approach that not only saves time but also ensures that the generated clips are both informative and engaging, enabling more efficient content consumption and distribution.

For example, a content marketer invests in or creates long duration content, e.g., long educational videos, blog posts, and podcasts that are relevant and reused and promoted on social media. The natural language processing apparatus of the present disclosure is configured to generate multiple engaging social posts based on a section of the video that saves time and effort of the content marketer to create more value of the initial investment (e.g., investment in creating long duration content).

The present disclosure describes systems and methods for video processing, more specifically for video to snippet generation. According to an example, a natural language processing apparatus of the present disclosure includes a large language model to generate a representation of the input video and uses the representations to generate the snippets.

An embodiment of the present disclosure is configured to generate social video clips based on an input video. For example, the input video contains an audio component, including voice recordings or spoken dialogue. In some cases, the clip generation process is classified as preliminary clip generation; clip ranking and description generation; and harm and bias removal. In some cases, once a video is uploaded to the natural language processing apparatus, an automatic speech recognition (ASR) system is used to obtain an unstructured transcript of the video (e.g., long-form video).

An embodiment of the present disclosure is configured to extract sentences from the unstructured transcript. In some cases, a segmentation model is used to segment the unstructured transcript and identify a plurality of sentences from the unstructured transcript. Next, the natural language processing apparatus of the present disclosure segments the transcript into smaller portions. For example, the natural language processing apparatus implements a dynamic algorithm to generate a block (such as a paragraph comprising a plurality of sentences).

In some cases, the segmentation is performed to ensure support for long transcripts that exceed the context size of the large language model (LLM). In some cases, the natural language processing apparatus sends a segment to the LLM and prompts the LLM to generate short clips for the input video using an identification information of the plurality of sentences in the block. In some examples, the user provides an input prompt to the LLM that defines a duration of the video clip based on a start time and an end time of the plurality of sentences.

According to an embodiment, each of the generated clips are transmitted to the LLM. In some cases, the LLM is prompted to score each clip based on relevant aspects (such as catchiness/hookiness, standaloneness, humor, and positivity). For example, the user provides an input prompt to the LLM that describes each of the relevant aspects. In some examples, the input prompt directs the LLM to score each video clip on a scale between 1 and 5 and provide a brief explanation of the scoring. In some cases, the input prompt directs the LLM to generate a title for the generated clip.

Subsequently, the natural language processing apparatus of the present disclosure combines each of the score values to generate a final score. For example, the large language model is configured to compute an average of the catchiness score, standalone score, humor score, and positivity score to generate a video clip score. In some cases, the natural language processing apparatus sorts the clips based on the video clip score. In some cases, the sorted clips are displayed to the user.

Additionally or alternatively, the LLM is prompted to generate a title and a short description for each clip. Once the video clips are generated, the natural language processing apparatus ensures removal of harmful content in the generated title and description. In some examples, each of the generated titles and descriptions are filtered using the LLM. For example, the filtered titles and descriptions do not include content that is flagged as being harmful or biased. In some examples, an input prompt is provided to the LLM that prompts the LLM to rate the titles and descriptions based on a description of different aspects of harmful content provided by the input prompt.

According to an embodiment, the AI model generates captions in a given style. For instance, a user may want to select a style and correct an error in transcription. In some cases, the AI model automatically emphasizes (e.g., via a color) certain words. In some cases, the AI model adds graphics (e.g., emojis, etc.) to an image.

Accordingly, by implementing an artificial intelligence (AI) model based on the language model, embodiments of the present disclosure are able to identify the most relevant aspects to recommend to a user. In some cases, the language model is able to generate a short duration video clip from a long duration video based on the most relevant aspects. Additionally, for example, for a given title and description of the video clip, the AI model identifies harm and bias information associated with the video clip and provides appropriate video clips to the user. In some cases, the AI model crops to portrait or squire aspect ratio based on a social media platform being used.

Embodiments of the present disclosure can be implemented in a machine learning model. For example, the machine learning model based on the present disclosure takes an input video (e.g., a long duration video) and generates a video clip of a short duration based on a portion of the input video. Example applications regarding generating a video clip based on a portion of the input video are provided with reference to FIGS. 1-3. Details regarding the architecture of the machine learning model are provided with reference to FIGS. 4-6 and 10-12. Details regarding a process of operation of the machine learning model are provided with reference to FIGS. 7-8. Examples of a process for training the machine learning model are provided with reference to FIG. 9.

Video Clipping System

A system and an apparatus for natural language processing are described with reference to FIGS. 1-8. FIG. 1 shows an example of a natural language processing system 100 according to aspects of the present disclosure. In one aspect, natural language processing system 100 includes user 105, user device 110, natural language processing apparatus 115, cloud 120, and database 125.

In the example of FIG. 1, user 105 provides an input video to natural language processing apparatus 115 via a user interface provided on user device 110 by natural language processing apparatus 115. Additionally, in some cases, user 105 provides a transcript of the input video to the natural language processing apparatus 115. As used herein, the input video provided by the user comprises an audio component, including voice recordings, ensuring audible playback. In some cases, the input video provided is a long duration video and the user wants to generate a plurality of video clips with a reduced duration. As an example shown in FIG. 1, the user provides a long duration input video that the user wants to generate a video clip from using the natural language processing apparatus 115 of the present disclosure.

In some cases, the natural language processing apparatus 115 implements a machine learning model (such as the machine learning model described with reference to FIGS. 4 and 11-12) to generate a video clip that shows a portion of the content in the user-provided input video. Additionally, in some cases, the user provides a transcript of the input video to the natural language processing apparatus 115. In some examples, the natural language processing apparatus 115 generates a video clip that depicts a portion of the input video for a duration as desired by the user. For example, as shown in FIG. 1, the natural language processing apparatus generates an output (i.e., a plurality of video clips) that depict distinct content extracted from the same input video (e.g., different portions of the input video).

Referring to the example of FIG. 1, the natural language processing apparatus 115 provides the generated video clips to user 105 via the user interface provided on user device 110. According to some aspects, user device 110 is a personal computer, laptop computer, mainframe computer, palmtop computer, personal assistant, mobile device, or any other suitable processing apparatus. In some examples, user device 110 includes software that displays a user interface (e.g., a graphical user interface) provided by natural language processing apparatus 115. In some aspects, the user interface provides for information (such as an input video (video clips), a transcript, etc.) to be communicated between user 105 and natural language processing apparatus 115. Natural language processing apparatus 115 is an example of, or includes aspects of, the corresponding element described with reference to FIGS. 2-4 and 11.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

According to some aspects, natural language processing apparatus 115 includes a computer-implemented network. In some embodiments, the computer-implemented network includes a machine learning model (such as the machine learning model described with reference to FIGS. 4-8). In some embodiments, natural language processing apparatus 115 also includes one or more processors, a memory subsystem, a communication interface, an I/O interface, one or more user interface components, and a bus as described with reference to FIG. 13. Additionally, in some embodiments, natural language processing apparatus 115 communicates with user device 110 and database 125 via cloud 120.

In some cases, natural language processing apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet. Some large cloud networks have functions distributed over multiple locations from central servers. A server is designated an edge server if it has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 110, natural language processing apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to natural language processing apparatus 115 and communicates with natural language processing apparatus 115 via cloud 120. According to some aspects, database 125 is included in natural language processing apparatus 115.

Figure 2:
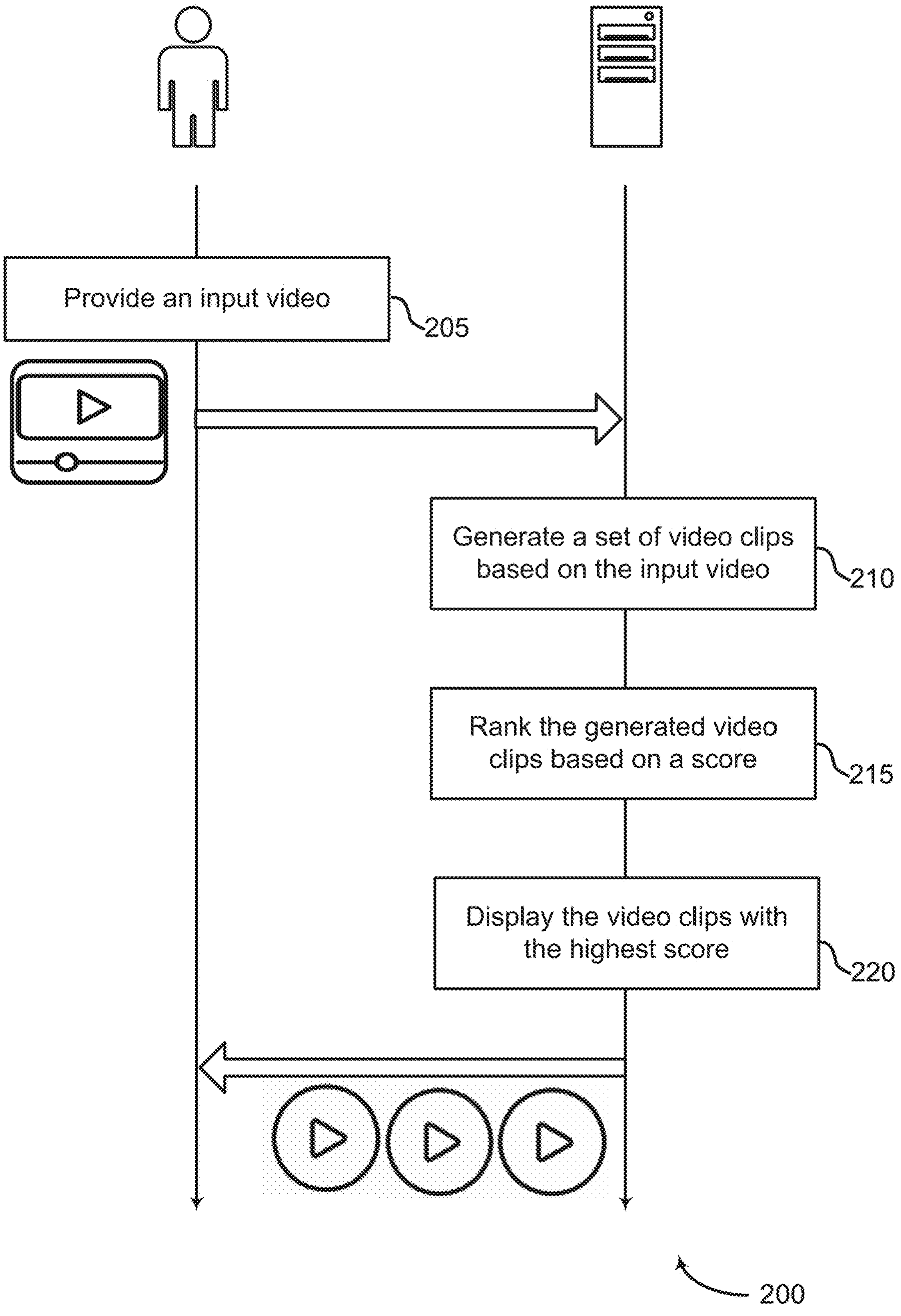
FIG. 2 shows an example of a method for generating a video clip according to aspects of the present disclosure.

FIG. 2 shows an example of a method 200 for generating a video clip according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to an embodiment of the present disclosure, a natural language processing apparatus (such as the natural language processing apparatus described with reference to FIGS. 3 and 14) provides a machine learning model (such as the machine learning model described with reference to FIGS. 4-8 and 11-12) that generates a synthetic output (e.g., a video clip) including a portion of the content of the input video.

At operation 205, the system provides an input video. In some cases, the operations of this step refer to, or may be performed by, a user as described with reference to FIG. 1.

In some examples, the user provides an input video to the natural language processing apparatus (such as the natural language processing apparatus described with reference to FIG. 1). In some cases, the user provides a transcript (e.g., an unstructured transcript) of the input video. Additionally, in some cases, the user provides an input prompt to the natural language processing apparatus that indicates a duration (e.g., a start time and an end time) of the generated video clip. For example, the user wants the generated video (i.e., video clip) to depict a portion of the input video the duration of which is specified in the input prompt. In some cases, the user provides the input video to the natural language processing apparatus via a user interface (such as a graphical user interface) provided on a user device by the natural language processing apparatus.

At operation 210, the system generates a set of video clips based on the input video. In some cases, the operations of this step refer to, or may be performed by, a natural language processing apparatus as described with reference to FIGS. 1, 3-4 and 11.

In some cases, the natural language processing apparatus includes a segmentation model that is configured to receive a transcript of the input video. For example, the transcript is provided by the user. In some examples, the transcript (e.g., the unstructured transcript) is generated by a speech recognition software (e.g., an automatic speech recognition (ASR) that enables a device to recognize and process spoken language). In some cases, the segmentation model is used to divide the transcript into a plurality of (e.g., meaningful) sentences.

According to an embodiment, the natural language processing apparatus includes a language model configured to process the plurality of sentences to generate a video clip. For example, the user provides an input prompt to the language model that describes a duration of the video clip based on a start time and an end time for the plurality of sentences. Further details regarding generation of the video clip is provided with reference to at least FIG. 4.

At operation 215, the system ranks the generated video clips based on a score. In some cases, the operations of this step refer to, or may be performed by, a natural language processing apparatus as described with reference to FIGS. 1, 3, and 4.

In some cases, the user provides another input prompt to the language model that describes a method of computing the score. For example, the score is computed for each of the generated video clips. In some examples, the language model computes a catchiness score, a standalone score, a humor score, a positivity score, or any combination thereof for each of the generated video clips and ranks the clips based on the score.

At operation 220, the system displays the video clips with the highest score. In some cases, the operations of this step refer to, or may be performed by, a natural language processing apparatus as described with reference to FIGS. 1, 3, and 4.

Embodiments of the present disclosure are configured to generate a video clip based on an input video (e.g., using processes described with reference to at least FIG. 7). For example, the natural language processing apparatus is able to generate a video clip by incorporating a portion of the content of the input video. For example, in some cases, the natural language processing apparatus displays the generated video clip to the user via the user interface (such as the user interface described with reference to FIG. 1). In some examples, the user provides information related to the desired number of video clips to be generated via the input prompt.

Figure 3:
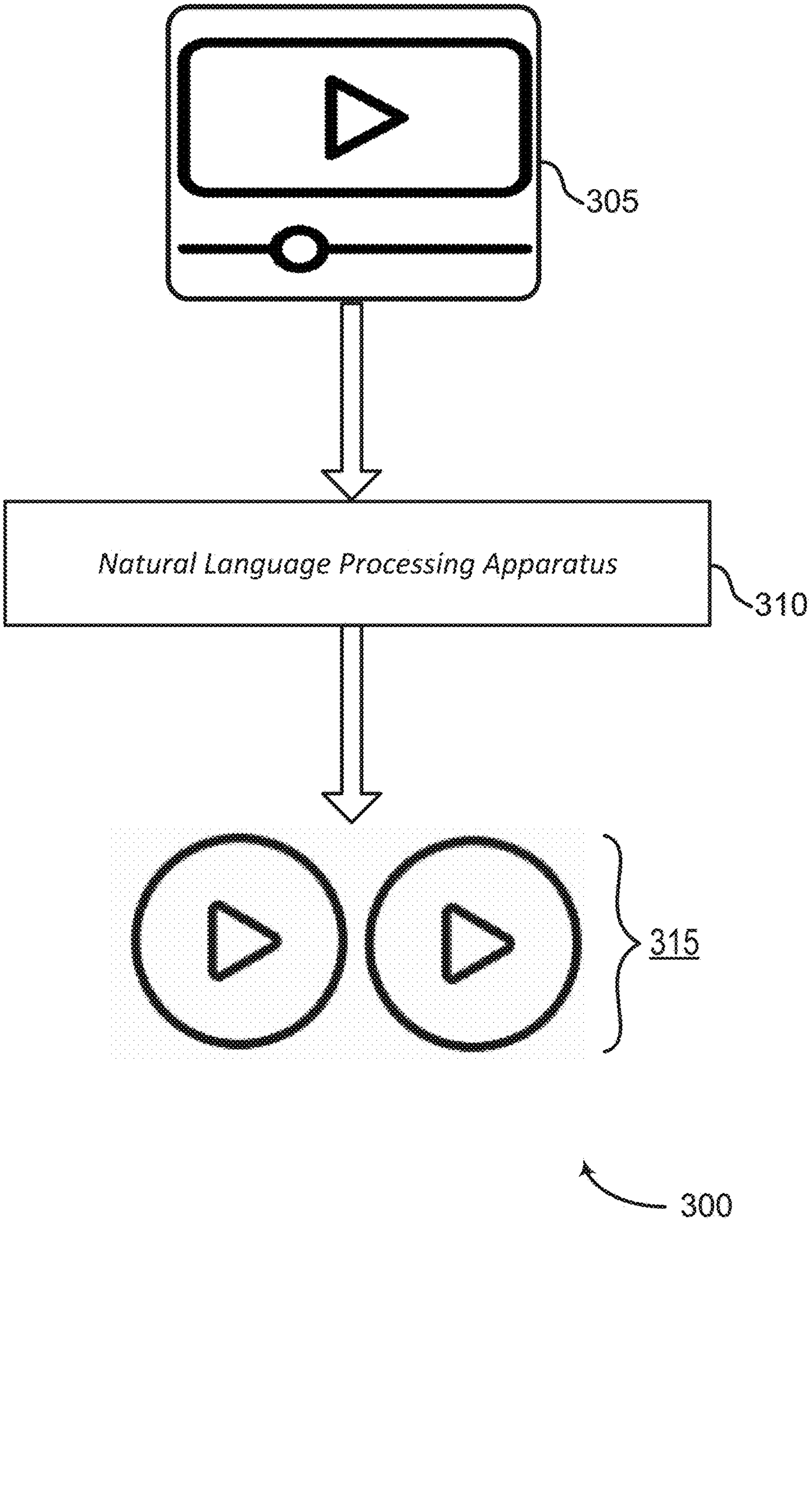
FIG. 3 shows an example of a video clipping process according to aspects of the present disclosure.

FIG. 3 shows an example of a video clipping process 300 according to aspects of the present disclosure. In one aspect, video clipping process 300 includes input video 305, natural language processing apparatus 310, and video clip 315.

Referring to FIG. 3, input video 305 is a long duration video that the user wants to generate a short duration video clip from. In some cases, input video 305 includes an audio component comprising spoken dialog. Input video 305 is an example of, or includes aspects of, the corresponding element described with reference to FIG. 4.

The natural language processing apparatus 310 (such as the natural language processing apparatus described with reference to FIGS. 1-2, 4, and 11-12) of the present disclosure receives the input video 305 from the user. In some cases, the natural language processing apparatus 310 extracts a portion of content of the input video 305 to generate a video clip 315. For example, the natural language processing apparatus 310 generates a short duration (e.g., duration of video clip 315 is less than duration of input video 305) video clip 315. Natural language processing apparatus 310 is an example of, or includes aspects of, the corresponding element described with reference to FIGS. 1 and 4. Video clip 315 is an example of, or includes aspects of, the corresponding element described with reference to FIG. 4.

Embodiments of the present disclosure include a natural language processing apparatus configured to perform video processing, more specifically to perform video to snippet generation. According to an example, the natural language processing apparatus of the present disclosure includes a large language model to generate a representation of the input video and uses the representations to generate the snippets. In some cases, the language model incorporates a user-provided input prompt to generate short video clips (e.g., snippets) for the input video based on a duration information provided in the input prompt. In some cases, the language model ranks each short clip based on computing a score.

Figure 4:
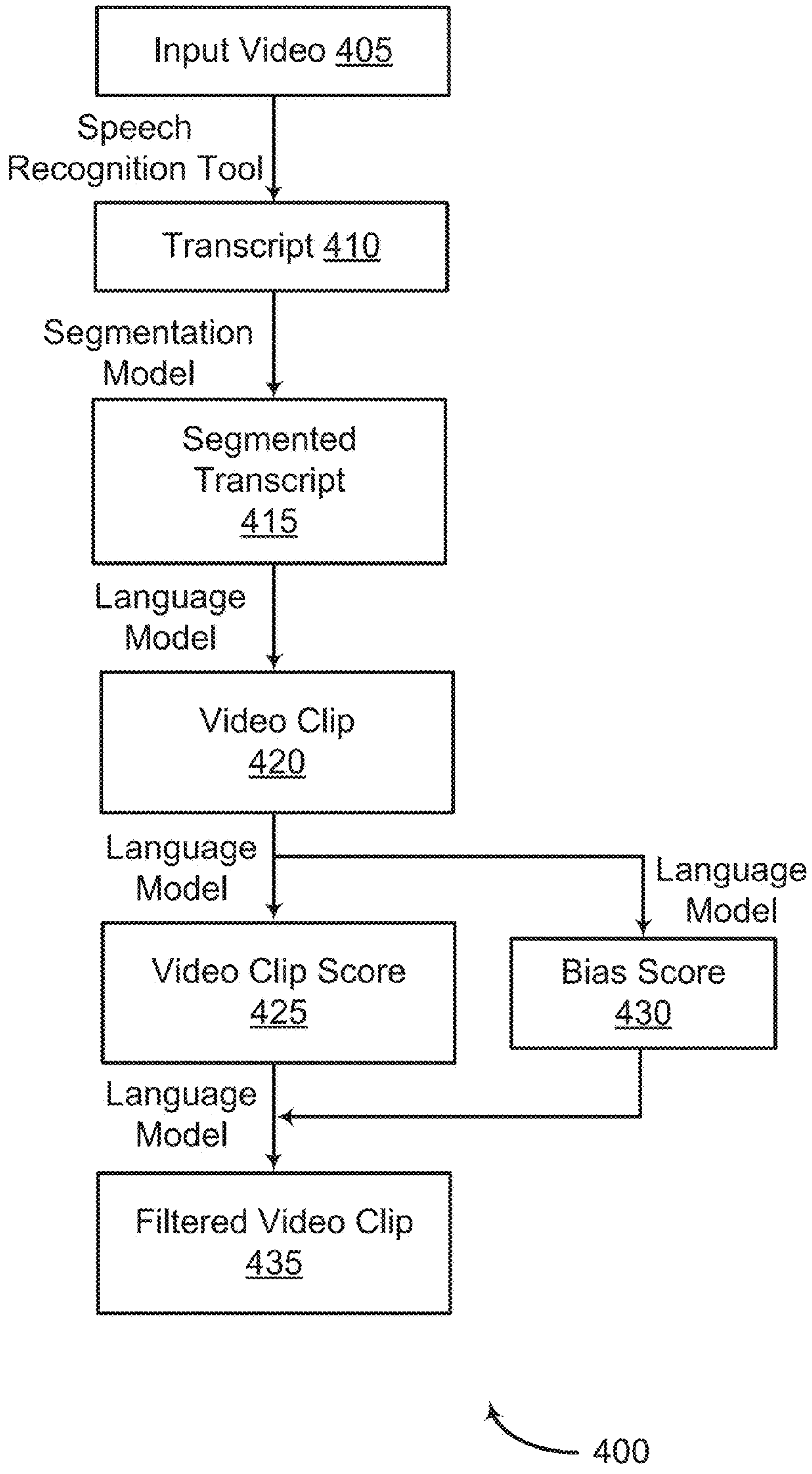
FIG. 4 shows an example of a natural language processing apparatus according to aspects of the present disclosure.

FIG. 4 shows an example of a natural language processing apparatus 400 according to aspects of the present disclosure. Natural language processing apparatus 400 is an example of, or includes aspects of, the corresponding element described with reference to FIGS. 1 and 3.

In one aspect, natural language processing apparatus 400 includes input video 405, transcript 410, segmented transcript 415, video clip 420, video clip score 425, bias score 430, and filtered video clip 435. Input video 405 is an example of, or includes aspects of, the corresponding element described with reference to FIG. 3. Video clip 420 is an example of, or includes aspects of, the corresponding element described with reference to FIG. 3.

The natural language processing apparatus 400 receives input video 405 via a user interface provided by the natural language processing apparatus 400. In some cases, the natural language processing apparatus 400 includes a machine learning model (such as machine learning model described with reference to FIGS. 11-12) comprising a segmentation model (such as segmentation model 1215 described with reference to FIG. 12) and a language model (such as language model 1205 described with reference to FIG. 12) for generation of video clip 420. In some cases, the natural language processing apparatus 400 receives a transcript of the input video 405.

Additionally or alternatively, the natural language processing apparatus 400 includes a machine learning model comprising a speech recognition tool, the segmentation model, and the language model. For example, the speech recognition tool is an automatic speech recognition (ASR) model that relies on machine learning and natural language processing (NLP) to interpret speech patterns, phonetics, and linguistic structures. In some examples, the speech recognition tool generates transcript 410 based on input video 405.

NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers.

Referring again to FIG. 4, the segmentation model of the machine learning model (such as machine learning model described with reference to FIGS. 11-12) is configured to extract a sentence from the transcript 410 to generate segmented transcript 415. For example, the segmentation model is used to perform sentence segmentation, i.e., identify a boundary of the sentence (e.g., a set of sentences). In some examples, the segmentation model is used to identify the boundary based on a start time information and an end time information of a sentence.

In some cases, the machine learning model of the present disclosure implements a dynamic programming algorithm configured to divide the transcript into a plurality of segments. For example, the algorithm is used to divide the transcript into a plurality of segments or blocks (e.g., paragraphs) after performing the sentence segmentation. In some examples, the plurality of blocks are based on the context size of the language model, i.e., the generation of blocks ensures that the machine learning model is able to support long transcripts exceeding the context size of the language model.

In some cases, each segment of the plurality of segments is transmitted to the language model to generate video clip 420. For example, the language model is an off-the-shelf large language model (LLM) such as GPT4o-mini model. According to some aspects, user provides a first input prompt based on the set of sentences. In some examples, user provides the first input prompt to the language model for generation of video clip 420.

An LLM works by processing vast amounts of text data during the training phase. LLMs learn patterns, relationships between words, and how to predict the next word or phrase based on context. LLMs are trained on enormous datasets, such as books, articles, websites, and other written material and use the data to learn the statistical relationships between words and phrases. Text input is divided into smaller units called tokens, such as words or subwords. Each token has an associated vector representation that the model uses to understand and generate text. The model analyzes sequences of tokens to understand the context of each word or phrase which enables generation of text that is coherent and contextually appropriate.

According to an embodiment of the present disclosure, the first input prompt is used to describe aspects that the user wants to include in the generated video clip 420. For example, the first input prompt provided to the language model begins by providing an overview such as "You are an experienced video highlight editor tasked with creating engaging teaser clips from a transcript. The transcript comprises a series of sentences with their start and end times. Your goal is to select consecutive sentences to form ALL_CLIP_CANDIDATES teaser highlights. Each highlight should be self-contained, engaging, and run between approximately 4 to 20 sentences in length. Ensure that each highlight beings and concludes coherently."

Further, the first input prompt provides additional (e.g., more specific) details regarding the video clip 420 to be generated, such as: "The transcript is provided as a list of sentences with ID. Your output should consist solely of the IDs of the sentences to form each highlight. The sentence IDs must be consecutive and maintain their original order from the transcript. Use the following format for the output: \n\n'''\n[[a,b,c, . . . ],[m,n,o, . . . ],[x,y,z, . . . ], . . . ]\n''' This nested integer array represents ALL_CLIP_CANDIDATES highlight clip. Ensure the output can be parsed correctly as nested arrays of numbers. Example: If your transcript has sentences numbered 1 to N, an output might look like [[1,2,3], [6,7,8,9,10], . . . ] Provide only the nested integer array as the output without any additional text. SENTENCES".

An embodiment of the present disclosure is configured to score and sort the generated video clips. For example, the language model computes video clip score 425 of the generated video clip 420. According to some aspects, user provides a second input prompt based on the set of sentences. In some examples, user provides the second input prompt describing aspects for ranking the video clip 420 to the language model. For example, the language model is prompted to score each clip for catchiness (i.e., hookiness), standaloneness, humor, and positivity.

Additionally, in some examples, the second input prompt describes aspects for generating a title of the video clip 420. The second input prompt is used to prompt the language model to generate a title and a brief description for the generated video clip 420. In some examples, the language model generates filtered video clip 435 based on the second input prompt.

For example, the second input prompt begins by providing an overview such as "Given a list of short teaser video transcriptions, you are an expert in scoring them. For each of the clips, you will propose a short title and four score on these aspects: (1) hookiness (2) standaloneness (3) humor (4) positivity. The title should be less than 5 words. Each score should be between 1 and 5. Also provide one-sentence explanation on your scoring."

Additionally, the second input prompt describes aspects for scoring the video clip 420. For example, the second input prompt describes a system for scoring according to hookiness as: "Here are some questions to think about for scoring for hookiness: 1. Are there elements in the clip that can make it viral? The more likely a video to go viral, the more hooky it is. 2. Does the content of the clip provide informative and valuable insights? The more informative the content, the more hooky the clip is. 3. Is the content descriptive and engaging enough to encourage viewers to share and discuss it? The more engaging the content, the more hooky the video is".

Similarly, the second input prompt describes a system for scoring according to standaloneness as: "Here are some questions to think about for scoring for standaloneness: 1. Does this clip have a clear start and end of a thought? The better the start and end are the more standalone the clip is. 2. Is there some reference to some information outside of the clip that makes it confusing without the extra context? If so the clip should get a lower score for standaloneness. 3. Does the flow of information make sense and can you understand what the clip is trying to say? The better the flow of information, the higher the standaloneness score is".

Further, the second input prompt describes a system for scoring according to humor as: "Here are some questions to think about for scoring for humor: 1. Is there a subtle joke in the clip? 2. Is the content of clip happy and funny?". The second input prompt describes a system for scoring according to positivity as: "Here are some questions to think about for scoring for positivity: 1. Is the content exciting? 2. Is the content positive, optimistic, and motivating?".

The second input prompt provides details for the output format as: "Use the following output format: "[{{"hookiness": {{"reason": string, "score": number}}, "standalone": {{"reason": string, "score": number}}, "humor": {{"reason": string, "score": number}}, "positivity": {{"reason": string, "score": number}}, "title": string}}, {{"hookiness": {{"reason": string, "score": number}}, "standalone": {{"reason": string, "score": number}}, "humor": {{"reason": string, "score": number}}, "positivity": {{"reason": string, "score": number}}, "title": string}}, . . . ]. The output must be able to be parsed as an array of objects. Do not start the response with "```json". Start your response with [{{Clip: {clips}".

The language model is configured to compute the catchiness (i.e., hookiness) score, the standalone score, the humor score, and the positivity score as described in the second input prompt. Next, the language model computes an average of the catchiness score, the standalone score, the humor score, and the positivity score to generate video clip score 425. The generated video clips are sorted in a descending order of the video clip score 425.

According to an exemplary embodiment, the language model is used to identify harmful content in the video clip 420 using the generated title and description to generate bias score 430. In some cases, the language model is prompted by a third input prompt that describes aspects of harmful and biased content. The language model is used to filter the identified harmful and biased content from the video clip 420 based on the bias score 430. The filtered video clip 435 is generated based on the video clip score 425 and the bias score 430.

For example, the third input prompt begins by providing an overview such as: "You are an expert ethics teacher specialized in harm and bias detection. Rate the level of offensiveness/harmfulness for the text "<<query>>" against each of the items below: 1. NSFW/Sexual: Degree (1-10) of implicit or explicit any of the following: sexual content, nudity, illegal sexual activities such as prostitution or human trafficking, sexual content involving minors, or other sexual implication unacceptable in a public setting. 2. Hate, Discrimination or Intolerance: Degree (1-10) of implicit or explicit hate speech, discrimination, or intolerance based on race, religion, gender, nationality, profession, sexual orientation or social group. 3. Violence, Gore: Degree (1-10) of implicit or explicit graphical content, violence or gore, either as an image the text would generate, through the message the text sends, or as a future possibility stemming from the content of the text. 4. Mental Health: Degree (1-10) of mental health issues implicitly or explicitly stated, used in a derogatory or insensitive manner, including self-harm. 5. Illegal Substances or Activities: Degree (1-10) of implicit or explicit any of the following: illegal drugs, paraphernalia, or activities such as theft, vandalism, or other forms of crime. 6. Inappropriate Message: Degree (1-10) of implicit or explicit inappropriate or harmful meaning, message or action in the text, including reinforcing stereotypes".

Figure 5:
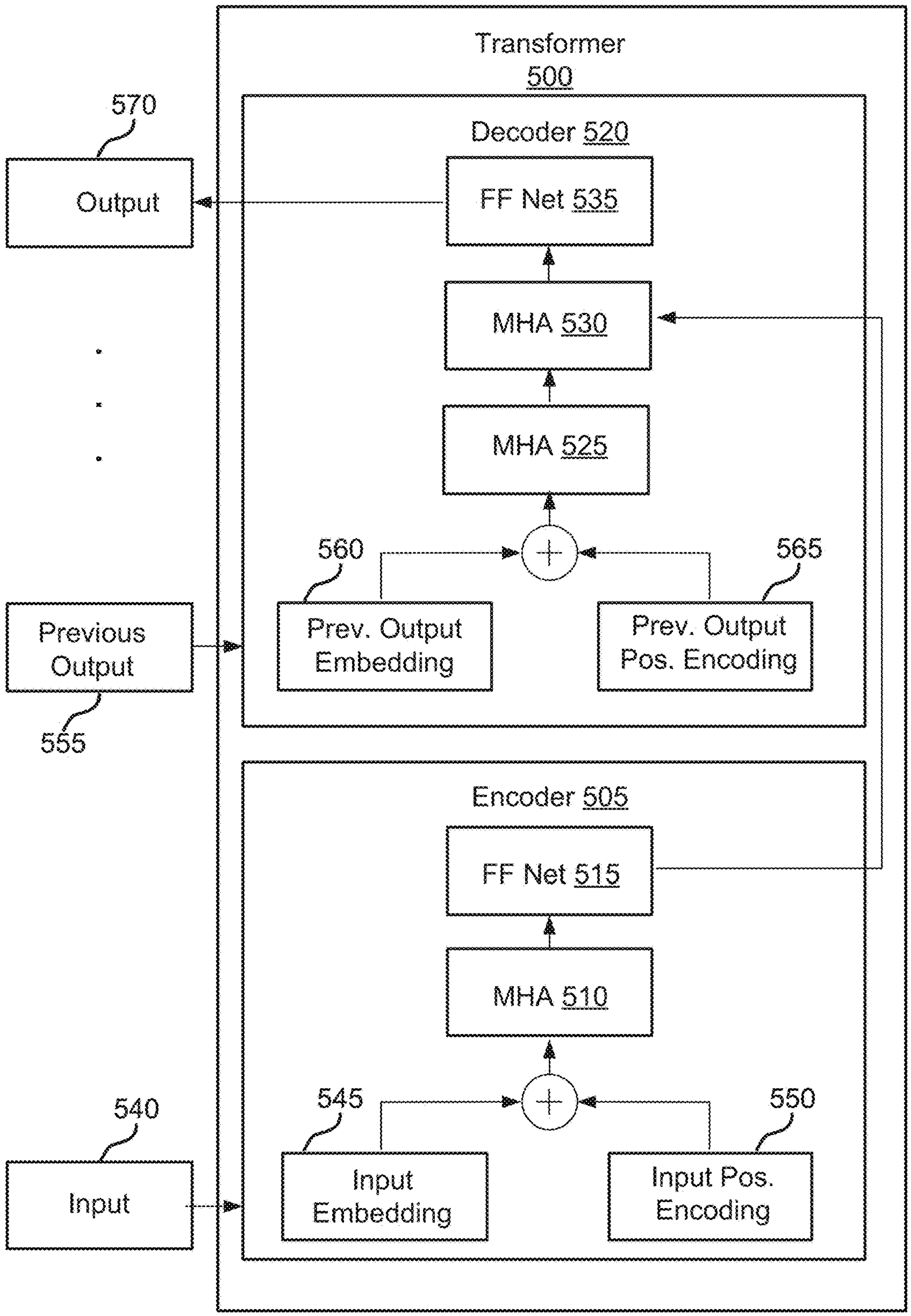
FIG. 5 shows an example of a transformer network according to aspects of the present disclosure.

FIG. 5 shows an example of a transformer network 500 according to aspects of the present disclosure. The example shown includes transformer 500, encoder 505, decoder 520, input 540, input embedding 545, input positional encoding 550, previous output 555, previous output embedding 560, previous output positional encoding 565, and output 570. According to some aspects, encoder 505 is implemented as a language model (such as the language model 1200 described with reference to FIG. 12). According to some aspects, transformer 500 is implemented in the language model (such as the language model described with reference to FIG. 4). According to some aspects, the language model is an autoregressive transformer model.

An autoregressive transformer model is a machine learning model for generating sequential data, such as text, by predicting each token based on the preceding ones. The model uses the transformer architecture as described herein, which employs an attention mechanism to capture token dependencies efficiently. During training and inference, a causal mask ensures that only prior tokens are used to predict the next token, preventing access to future tokens. The model generates the sequence step-by-step, iteratively updating the input with each newly predicted token. The autoregressive transformer model is highly effective in applications such as natural language processing, machine translation, and text generation.

Referring to FIG. 5, encoder 505 includes multi-head self-attention sublayer 510 and feed-forward network sublayer 515. In some cases, decoder 520 includes first multi-head self-attention sublayer 525, second multi-head self-attention sublayer 530, and feed-forward network sublayer 535.

In some cases, encoder 505 is configured to map input 540 (for example, a text prompt) to a sequence of continuous representations that are fed into decoder 520. In some cases, decoder 520 generates output 570 (e.g., a prediction of an output sequence of words or tokens) based on the output of encoder 505 and previous output 555 (e.g., a previously predicted output sequence), which allows for the use of autoregression.

For example, in some cases, encoder 505 parses input 540 into tokens and vectorizes the parsed tokens to obtain input embedding 545, and adds input positional encoding 550 (e.g., positional encoding vectors for input 540 of a same dimension as input embedding 545) to input embedding 545. In some cases, input positional encoding 550 includes information about relative positions of words or tokens in input 540.

In some cases, encoder 505 comprises one or more encoding layers that generate contextualized token representations, where each representation corresponds to a token that combines information from other input tokens via self-attention mechanism. In some cases, each encoding layer of encoder 505 comprises a multi-head self-attention sublayer (e.g., multi-head self-attention sublayer 510). In some cases, the multi-head self-attention sublayer implements a multi-head self-attention mechanism that receives different linearly projected versions of queries, keys, and values to produce outputs in parallel. In some cases, each encoding layer of encoder 505 also includes a fully connected feed-forward network sublayer (e.g., feed-forward network sublayer 515) comprising two linear transformations surrounding a Rectified Linear Unit (ReLU) activation:

$$FFN(x) = ReLU(W_1x + b_1)W_2 + b_2 \tag{1}$$

In some cases, each layer employs different weight parameters ($W_1$, $W_2$) and different bias parameters ($b_1$, $b_2$) to apply a same linear transformation each word or token in input 540.

In some cases, each sublayer of encoder 505 is followed by a normalization layer that normalizes a sum computed between a sublayer input x and an output sublayer (x) generated by the sublayer:

$$layernorm(x + \text{sublayer}(x)) \tag{2}$$

In some cases, encoder 505 is bidirectional because encoder 505 attends to each word or token in input 540 regardless of a position of the word or token in input 540.

According to some aspects, encoder 505 functions as a language encoder of the language model. In an example, the language encoder splits an input text into fixed-size patches, generates a linear embedding of each of the patches, adds position embeddings to each of the linear embeddings, and provides the resulting sequence of vectors as input 540 to encoder 505.

In some cases, decoder 520 comprises one or more decoding layers (e.g., six decoding layers). In some cases, each decoding layer comprises three sublayers including a first multi-head self-attention sublayer (e.g., first multi-head self-attention sublayer 525), a second multi-head self-attention sublayer (e.g., second multi-head self-attention sublayer 530), and a feed-forward network sublayer (e.g., feed-forward network sublayer 535). In some cases, each sublayer of decoder 520 is followed by a normalization layer that normalizes a sum computed between a sublayer input x and an output sublayer (x) generated by the sublayer.

In some cases, decoder 520 generates previous output embedding 560 of previous output 555 and adds previous output positional encoding 565 (e.g., position information for words or tokens in previous output 555) to previous output embedding 560. In some cases, each first multi-head self-attention sublayer receives the combination of previous output embedding 560 and previous output positional encoding 565 and applies a multi-head self-attention mechanism to the combination. In some cases, for each word in an input sequence, each first multi-head self-attention sublayer of decoder 520 attends only to words preceding the word in the sequence, and so a prediction of transformer 500 for a word at a particular position only depends on known outputs for a word that came before the word in the sequence. For example, in some cases, each first multi-head self-attention sublayer implements multiple single-attention functions in parallel by introducing a mask over values produced by the scaled multiplication of matrices Q and K by suppressing matrix values that would otherwise correspond to disallowed connections.

In some cases, each second multi-head self-attention sublayer implements a multi-head self-attention mechanism similar to the multi-head self-attention mechanism implemented in each multi-head self-attention sublayer of encoder 505 by receiving a query Q from a previous sublayer of decoder 520 and a key K and a value V from the output of encoder 505, allowing decoder 520 to attend to each word in the input 540.

In some cases, each feed-forward network sublayer implements a fully connected feed-forward network similar to feed-forward network sublayer 515. In some cases, the feed-forward network sublayers are followed by a linear transformation and a softmax to generate a prediction of output 570.

Figure 6:
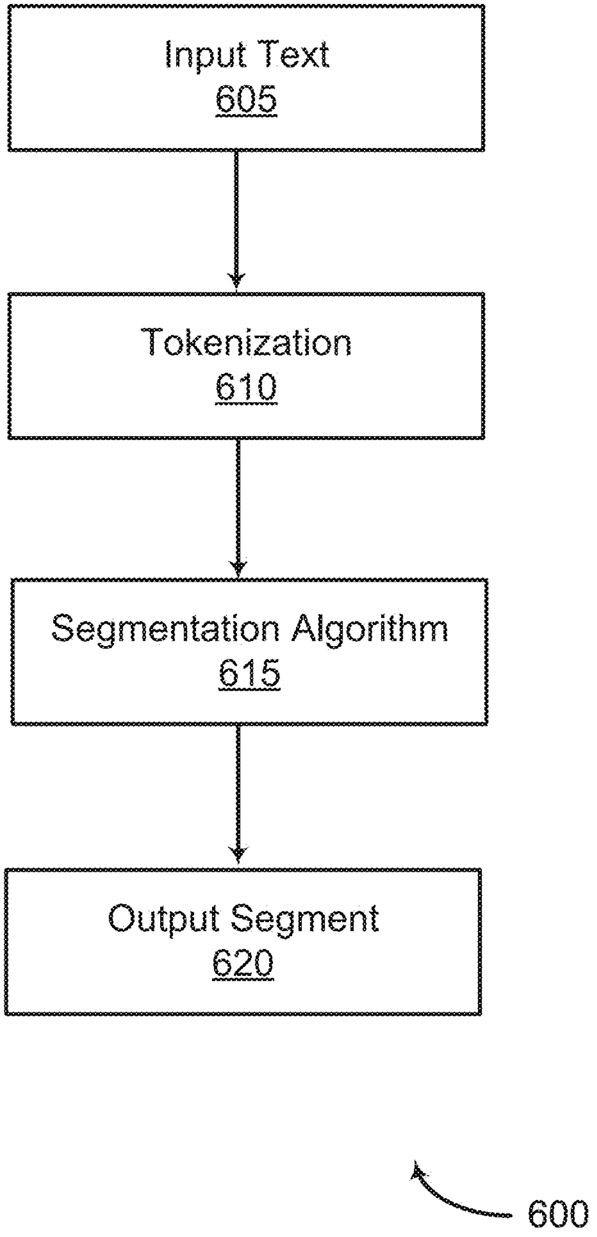
FIG. 6 shows an example of a text segmentation model according to aspects of the present disclosure.

FIG. 6 shows an example of a text segmentation model 600 according to aspects of the present disclosure. In one aspect, text segmentation model 600 includes receiving input text 605, tokenization 610, segmentation algorithm 615, and generating output segment 620.

The present disclosure relates to a method for text segmentation in a natural language processing (NLP) system. The text segmentation model 600 is a machine learning model (such as a machine learning model described with reference to FIGS. 4 and 11-12). In some cases, the text segmentation model 600 is designed to identify and isolate meaningful segments within a text document, such as words, sentences, or paragraphs, thereby enhancing subsequent analysis tasks like text classification, machine translation, or information retrieval.

The text segmentation model 600 is configured to receive raw text such as input text 605. For example, input text 605 comprises a continuous stream of characters or words without clear delimiters. As a first step, the text segmentation model 600 preprocesses the input text 605 by applying tokenization 610. As part of the tokenization 610, the input text 605 is broken down into basic linguistic units. In some cases, the units range from individual characters to words or even subword tokens, depending on the specific application. For example, tokenization 610 is accomplished using rule-based techniques, such as whitespace and punctuation parsing, or machine learning models that are trained to recognize meaningful linguistic units.

After completion of tokenization 610, the text segmentation model 600 performs a segmentation process. During the segmentation process, the text segmentation model 600 implements segmentation algorithm 615 that divides the tokenized text into distinct segments, i.e., output segment 620, based on various linguistic, contextual, and structural cues. For example, the cues include punctuation marks, whitespace patterns, and part-of-speech tags, which help the text segmentation model 600 identify boundaries between different text segments.

According to an embodiment, the machine learning model trained on annotated datasets are employed to identify segmentation points. In some cases, the machine learning model is used in handling unstructured text or poorly formatted documents. The text segmentation model 600 generates output segment 620 which is the output of a structured representation of the segmented text. The output segment 620 is available for use in downstream applications such as described with reference to at least FIGS. 4 and 7-8.

Accordingly, an apparatus for natural language processing is described. One or more aspects of the apparatus include a memory component; a processing device coupled to the memory component, the processing device configured to perform operations comprising: obtaining an input video and a transcript of the input video, wherein the transcript comprises a plurality of sentences; generating, using a language model, a subset of the plurality of sentences based on the transcript; and generating a video clip based on the input video and a subset of the plurality of sentences, wherein the video clip comprises a portion of the input video.

In some aspects, the language model comprises an autoregressive transformer model. Some examples of the apparatus and system further include a segmentation model configured to segment the transcript to identify the plurality of sentences.

Some examples of the apparatus and system further include generating a plurality of subsets of the plurality of sentences. Some examples further include scoring each of the plurality of subsets to obtain a plurality of video clip scores, respectively. Some examples further include ranking the plurality of subsets based on the plurality of video clip scores to obtain a video clip ranking, wherein the video clip is generated based on the video clip ranking.

Video Clip Generation Process

A content creator consistently generates a high amount of content. In some cases, creation of new content is time consuming and needs resources. In some cases, the content creator creates a long duration video, portions of which are extracted to enhance audience interest in the content. Existing video processing systems perform manual extraction of a portion of the long duration video to generate a short video clip that is uploaded on a social media website.

By contrast, embodiments of the present disclosure are configured to perform an automatic extraction of a portion of a long duration input video to generate a short duration video clip. In some cases, a natural language processing apparatus of the present disclosure generates a transcript of the input video. In some cases, the natural language processing apparatus is configured to process the transcript to generate a segmented transcript. For example, the segmented transcript includes paragraphs that divide the transcript into blocks. In some examples, the segmented transcript includes structured sentences, e.g., sentences with identified boundaries.

The segmented transcript is further processed by a language model of the natural language processing apparatus to generate the video clip. For example, a prompt is used to direct the language model to generate the video clip. In some examples, the prompt provides a duration of the sentences based on computing a start time and an end time. In some examples, the prompt directs the language model to output a sentence identification information for generating the video clip.

Figure 7:
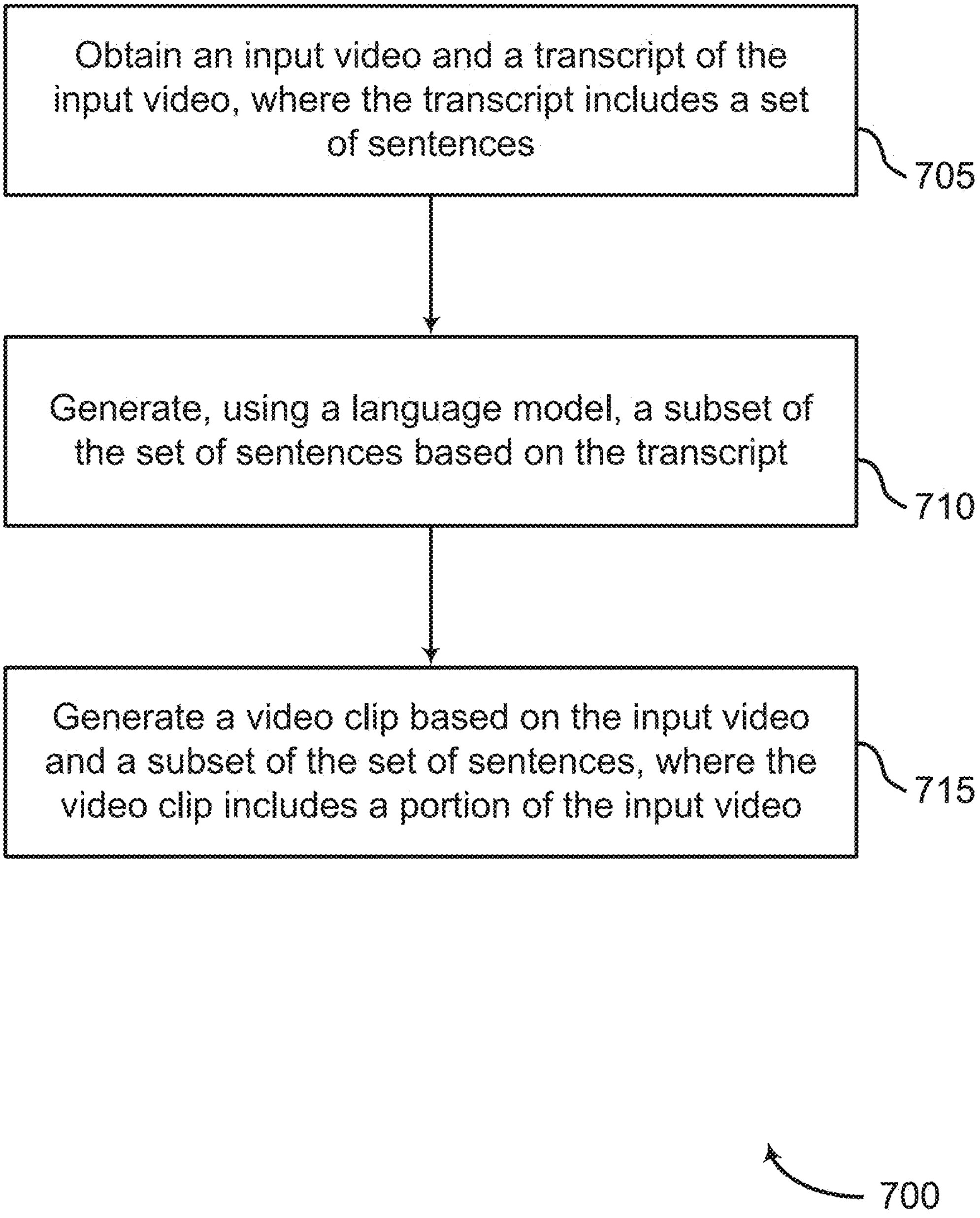
FIGS. 7 through 8 show examples of natural language processing according to aspects of the present disclosure.

FIG. 7 shows an example of a method 700 for natural language processing apparatus according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The present disclosure describes systems and methods for video clip generation. Embodiments of the present disclosure include a machine learning model comprising a segmentation model and a language model. In some cases, the segmentation model is configured to divide a transcript of an input video into a plurality of segments and the language model is prompted to generate a video clip based on the input video.

At operation 705, the system obtains an input video and a transcript of the input video, where the transcript includes a set of sentences. In some cases, the operations of this step refer to, or may be performed by, a natural language processing apparatus as described with reference to FIGS. 1, 3, and 4.

For example, in some cases, the user interface of the natural language processing apparatus (such as natural language processing apparatus 1100 described with reference to FIG. 11) receives an input video from a user. In some examples, the input video is a long duration video. In some examples, the natural language processing apparatus receives the input video from a database or any other data source. Additionally or alternatively, the user interface receives a transcript of the video from the user.

At operation 710, the system generates, using a language model, a subset of the set of sentences based on the transcript. In some cases, the operations of this step refer to, or may be performed by, a language model as described with reference to FIGS. 4 and 12.

According to an embodiment, the language model is configured to extract a portion of the video to generate a video clip. In some cases, the language model of the present disclosure receives segmented transcript (such as segmented transcript described with reference to FIG. 4) and extracts a clip from the segmented transcript. For example, a first input prompt is used to prompt the language model to generate the video clips based on a subset of consecutive sentences in the segmented transcript. Further details regarding this step are provided with reference to FIG. 4.

At operation 715, the system generates a video clip based on the input video and a subset of the set of sentences, where the video clip includes a portion of the input video. In some cases, the operations of this step refer to, or may be performed by, a language model as described with reference to FIG. 12.

For example, in some cases, the user interface of the natural language processing apparatus (such as natural language processing apparatus 1100 described with reference to FIG. 11) provides the generated video clip to the user. In some examples, the video clip is a short duration video comprising a portion of the input video. In some examples, the duration of the video clip is dynamically modified based on the duration of the input video and the number of video clips generated.

According to an embodiment of the present disclosure, the language model of the natural language processing apparatus is configured to provide the user with the most relevant clips. In some cases, the language model is configured to rank each video clip based on aspects including standaloneness (i.e., the video clip completes a thought of the content creator, e.g., the video clip does not start from or end at the middle of a thought), catchiness or hookiness (i.e., video clip is engaging and exciting), humor (i.e., the video clip has humor and includes subtle joke), and positivity (i.e., video clip discusses positive thoughts).

In some cases, each of the said aspects are described to the language model via a second input prompt. For example, the second input prompt is used to prompt the language model to provide a score (i.e., video clip score) for each of the generated video clips (such as video clips generated at operation 715 in FIG. 7 and further described in at least FIG. 4) based on the said aspects. In some examples, the video clip score is generated by computing an average of the scores associated with each of the aspects. Additionally, the second input prompt is used to prompt the language model to justify the scores associated with each of the aspects by providing a brief (e.g., one sentence) reason along with the score.

According to an embodiment, the input prompt (e.g., the second input prompt) is used to prompt the language model to generate a title and a description for each video clip. In some cases, the language model is further used to identify harmful or biased content in the video clip. For example, the language model uses the generated title and description for the identification. In some examples, a third input prompt is provided to the language model that describes aspects of harmful and biased content.

In some examples, the language model is configured to generate a score for the video clip based on the harmful and biased content. For example, the harmful and biased content is filtered based on aspects including hate (i.e., video clips comprising hate speech, discrimination, intolerance), violence (i.e., video clip showing violence or gore), mental health (i.e., video clip used in a derogatory or insensitive manner), illegal substances or activities (i.e., video clip including content related to illegal drugs, paraphernalia, etc.), and inappropriate message (i.e., video clip showing harmful or inappropriate content including reinforcing stereotypes).

Figure 8:
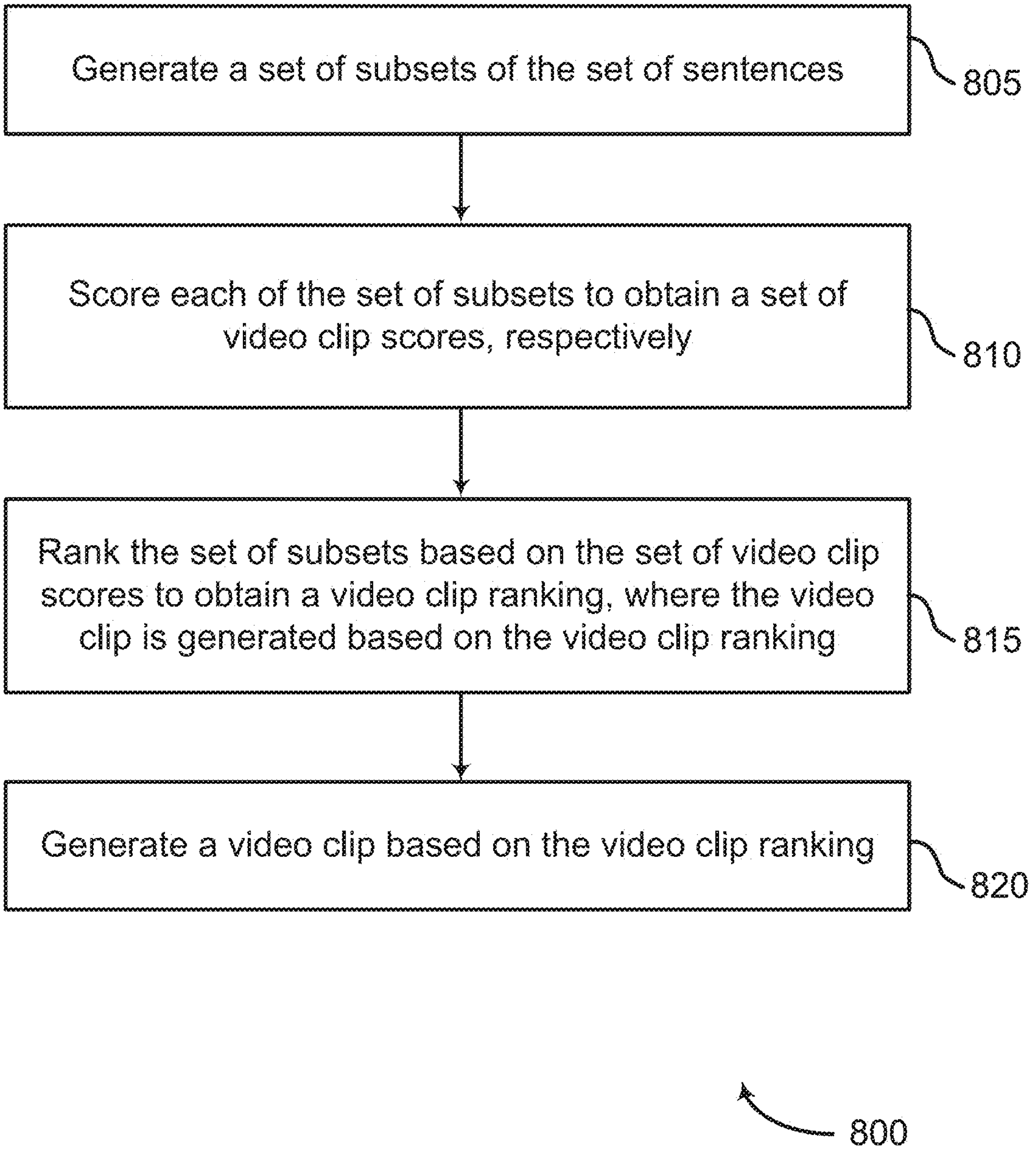

FIG. 8 shows an example of a method 800 for natural language processing apparatus according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system generates a set of subsets of the set of sentences. In some cases, the operations of this step refer to, or may be performed by, a language model as described with reference to FIG. 12. In some cases, the language model is configured to extract a portion of an input video to generate a video clip. For example, the language model receives segmented transcript and extracts a clip from the segmented transcript. For example, a first input prompt (such as first input prompt described with reference to at least FIG. 4) is used to prompt the language model to generate the video clips based on a subset of consecutive sentences in the segmented transcript. Further details regarding this step are provided with reference to FIG. 4.

At operation 810, the system scores each of the set of subsets to obtain a set of video clip scores, respectively. In some cases, the operations of this step refer to, or may be performed by, a language model as described with reference to FIG. 12.

For example, the language model is used to score the set of subsets based on aspects including catchiness, standaloneness, humor, and positivity to generate a catchiness sub-score, a standaloneness sub-score, a humor sub-score, and a positivity sub-score, respectively. In some examples, a second input prompt is provided to the language model that describes each of the said aspects (such as second input prompt as described with reference to at least FIG. 4). The language model computes the video clip score based on computing an average of the catchiness sub-score, the standaloneness sub-score, the humor sub-score, and the positivity sub-score.

At operation 815, the system ranks the set of subsets based on the set of video clip scores to obtain a video clip ranking. In some cases, the operations of this step refer to, or may be performed by, a language model as described with reference to FIG. 12. For example, the video clip ranking is obtained by sorting the set of subsets based on a descending order of the video clip scores.

At operation 820, the system generates the video clip based on the video clip ranking. In some cases, the operations of this step refer to, or may be performed by, a language model as described with reference to FIG. 12. For example, in some cases, the user interface of the natural language processing apparatus (such as natural language processing apparatus 1100 described with reference to FIG. 11) provides the generated video clip to the user.

In some examples, the video clip is a short duration video comprising a portion of the input video. In some examples, the video clip is an engaging video created from a long input video that can save the effort and time of the content creator to generate a new video while staying relevant on social media. In some examples, the video clip comprises filtered content (i.e., with harmful and biased content removed).

Accordingly, a method for natural language processing is described. One or more aspects of the method include obtaining an input video and a transcript of the input video, wherein the transcript comprises a plurality of sentences; generating, using a language model, a subset of the plurality of sentences based on the transcript; and generating a video clip based on the input video and a subset of the plurality of sentences, wherein the video clip comprises a portion of the input video.

Some examples of the method, apparatus, and non-transitory computer readable medium further include obtaining the transcript comprises: extracting audio data from the input video. Some examples further include generating the transcript based on the audio data. Some examples of the method, apparatus, and non-transitory computer readable medium further include segmenting the transcript to identify the plurality of sentences.

Some examples of the method, apparatus, and non-transitory computer readable medium further include generating the subset of the plurality of sentences comprises: dividing the plurality of sentences into one or more input blocks based on a context window of the language model. Some examples of the method, apparatus, and non-transitory computer readable medium further include generating the subset of the plurality of sentences comprising generating an input prompt based on the plurality of sentences. Some examples further include providing the input prompt to the language model.

Some examples of the method, apparatus, and non-transitory computer readable medium further include identifying start times and end times for the plurality of sentences, wherein the video clip is generated based on the start times and end times. Some examples of the method, apparatus, and non-transitory computer readable medium further include scoring the subset of the plurality of sentences using the language model to obtain a video clip score, wherein the video clip is ranked based on the video clip score.

Some examples of the method, apparatus, and non-transitory computer readable medium further include scoring the subset of the plurality of sentences comprises: generating a plurality of sub-scores for the subset. Some examples further include combining the plurality of sub-scores to obtain the video clip score. In some aspects, the plurality of sub-scores comprises a catchiness score, a standalone score, a humor score, a positivity score, or any combination thereof.

Some examples of the method, apparatus, and non-transitory computer readable medium further include generating a plurality of subsets of the plurality of sentences. Some examples further include scoring each of the plurality of subsets to obtain a plurality of video clip scores, respectively. Some examples further include ranking the plurality of subsets based on the plurality of video clip scores to obtain a video clip ranking, wherein the video clips are sorted based on the video clip ranking. Some examples of the method, apparatus, and non-transitory computer readable medium further include determining whether the subset of the plurality of sentences comprises a bias, wherein the video clip is generated based on the determination.

Additionally, a method for natural language processing is described. One or more aspects of the method include obtaining a transcript of an input video, wherein the transcript comprises a plurality of sentences; generating, using a language model, a plurality of subsets of the plurality of sentences based on the transcript; scoring each of the plurality of subsets to obtain a plurality of video clip scores, respectively; and ranking, using the language model, the plurality of subsets based on the plurality of video clip scores to obtain a video clip ranking.

A method for natural language processing apparatus is described. One or more aspects of the method include generating a video clip based on the input video and the plurality of subsets of the plurality of sentences, wherein the video clip comprises a portion of the input video.

A method for natural language processing apparatus is described. One or more aspects of the method include segmenting the transcript to identify the plurality of sentences.

A method for natural language processing apparatus is described. One or more aspects of the method include generating an input prompt based on the plurality of sentences and providing the input prompt to the language model.

A method for natural language processing apparatus is described. One or more aspects of the method include generating a plurality of sub-scores for each of the plurality of subsets and combining the plurality of sub-scores to obtain the plurality of video clip scores.

Training

Figure 9:
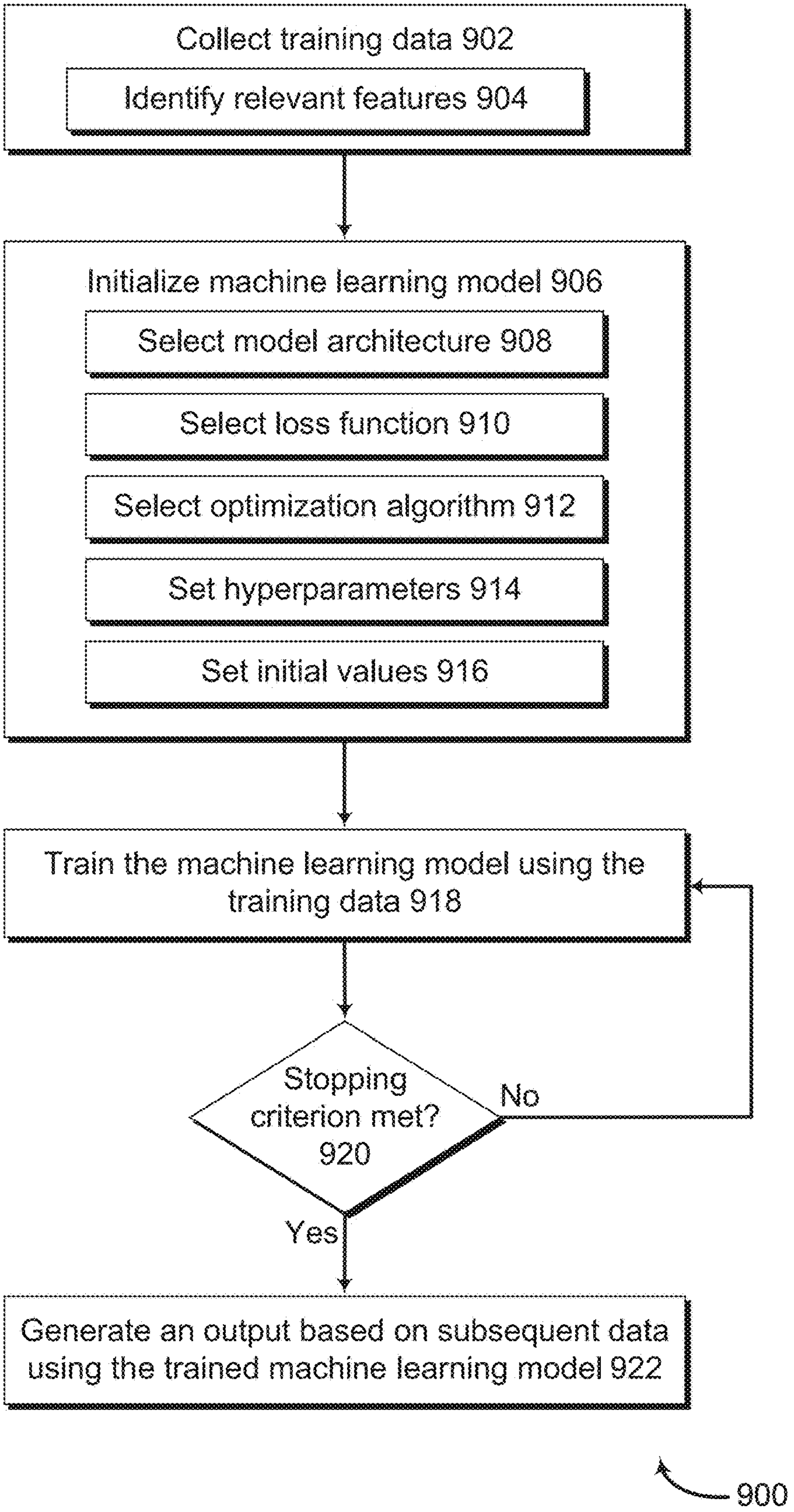
FIG. 9 shows an example of a method of training a machine learning model according to aspects of the present disclosure.

FIG. 9 shows an example of a method of training a machine learning model according to aspects of the present disclosure. FIG. 9 is a flow diagram depicting an algorithm as a step-by-step procedure 900 in an example implementation of operations performable for training a machine-learning model. In some embodiments, the procedure 900 describes an operation of the training component 1125 described for configuring the machine learning model 1115 as described with reference to FIG. 11. The procedure 900 provides one or more examples of generating training data, use of the training data to train a machine-learning model, and use of the trained machine-learning model to perform a task.

To begin in this example, a machine-learning system collects training data (block 902) that is to be used as a basis to train a machine-learning model, i.e., which defines what is being modeled. The training data is collectable by the machine-learning system from a variety of sources. Examples of training data sources include public datasets, service provider system platforms that expose application programming interfaces (e.g., social media platforms), user data collection systems (e.g., digital surveys and online crowdsourcing systems), and so forth. Training data collection may also include data augmentation and synthetic data generation techniques to expand and diversify available training data, balancing techniques to balance a number of positive and negative examples, and so forth.

The machine-learning system is also configurable to identify features that are relevant (block 904) to a type of task, for which the machine-learning model is to be trained. Task examples include classification, natural language processing, generative artificial intelligence, recommendation engines, reinforcement learning, clustering, and so forth. To do so, the machine-learning system collects the training data based on the identified features and/or filters the training data based on the identified features after collection. The training data is then utilized to train a machine-learning model.

In order to train the machine-learning model in the illustrated example, the machine-learning model is first initialized (block 906). Initialization of the machine-learning model includes selecting a model architecture (block 908) to be trained. Examples of model architectures include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

A loss function is also selected (block 910). The loss function is utilized to measure a difference between an output of the machine-learning model (i.e., predictions) and target values (e.g., as expressed by the training data) to be used to train the machine-learning model. Additionally, an optimization algorithm is selected (912) that is to be used in conjunction with the loss function to optimize parameters of the machine-learning model during training, examples of which include gradient descent, stochastic gradient descent (SGD), and so forth.

Initialization of the machine-learning model further includes setting initial values of the machine-learning model (block 914) examples of which includes initializing weights and biases of nodes to improve efficiency in training and computational resources consumption as part of training. Hyperparameters are also set that are used to control training of the machine learning model, examples of which include regularization parameters, model parameters (e.g., a number of layers in a neural network), learning rate, batch sizes selected from the training data, and so on. The hyperparameters are set using a variety of techniques, including use of a randomization technique, through use of heuristics learned from other training scenarios, and so forth.

The machine-learning model is then trained using the training data (block 918) by the machine-learning system. A machine-learning model refers to a computer representation that can be tuned (e.g., trained and retrained) based on inputs of the training data to approximate unknown functions. In particular, the term machine-learning model can include a model that utilizes algorithms (e.g., using the model architectures described above) to learn from, and make predictions on, known data by analyzing training data to learn and relearn to generate outputs that reflect patterns and attributes expressed by the training data.

Examples of training types include supervised learning that employs labeled data, unsupervised learning that involves finding an underlying structures or patterns within the training data, reinforcement learning based on optimization functions (e.g., rewards and/or penalties), use of nodes as part of "deep learning," and so forth. The machine-learning model, for instance, is configurable as including a plurality of nodes that collectively form a plurality of layers. The layers, for instance, are configurable to include an input layer, an output layer, and one or more hidden layers. Calculations are performed by the nodes within the layers through the hidden states through a system of weighted connections that are "learned" during training, e.g., through use of the selected loss function and backpropagation to optimize performance of the machine-learning model to perform an associated task.

As part of training the machine-learning model, a determination is made as to whether a stopping criterion is met (decision block 920), i.e., which is used to validate the machine-learning model. The stopping criterion is usable to reduce overfitting of the machine-learning model, reduce computational resource consumption, and promote an ability of the machine-learning model to address previously unseen data, i.e., that is not included specifically as an example in the training data. Examples of a stopping criterion include but are not limited to a predefined number of epochs, validation loss stabilization, achievement of a performance improvement threshold, whether a threshold level of accuracy has been met, or based on performance metrics such as precision and recall. If the stopping criterion has not been met ("no" from decision block 920), the procedure 900 continues training of the machine-learning model using the training data (block 918) in this example.

If the stopping criterion is met ("yes" from decision block 920), the trained machine-learning model is then utilized to generate an output based on subsequent data (block 922). The trained machine-learning model, for instance, is trained to perform a task as described above and therefore once trained is configured to perform that task based on subsequent data received as an input and processed by the machine-learning model. The machine learning model, is an example of, or includes aspects of, the corresponding element described with reference to FIGS. 2, 4-6, 7-8, and 10-12.

Computing Device

Figure 10:
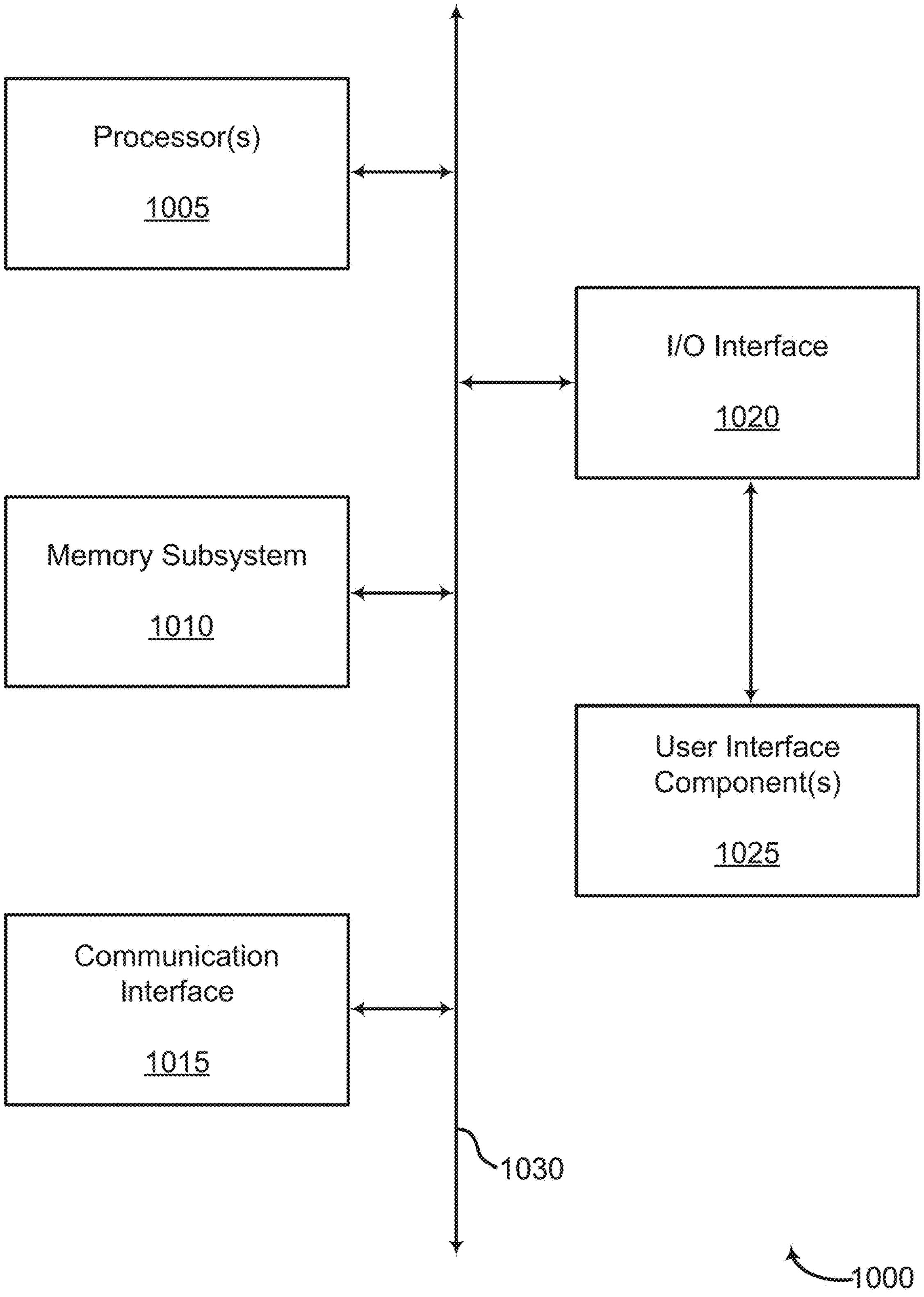
FIG. 10 shows an example of a computing device according to aspects of the present disclosure.

FIG. 10 shows an example of a computing device according to aspects of the present disclosure. The computing device 1000 may be an example of the natural language processing apparatus 1100 described with reference to FIG. 11. In one aspect, computing device 1000 includes processor(s) 1005, memory subsystem 1010, communication interface 1015, I/O interface 1020, user interface component(s) 1025, and channel 1030.

Figure 11:
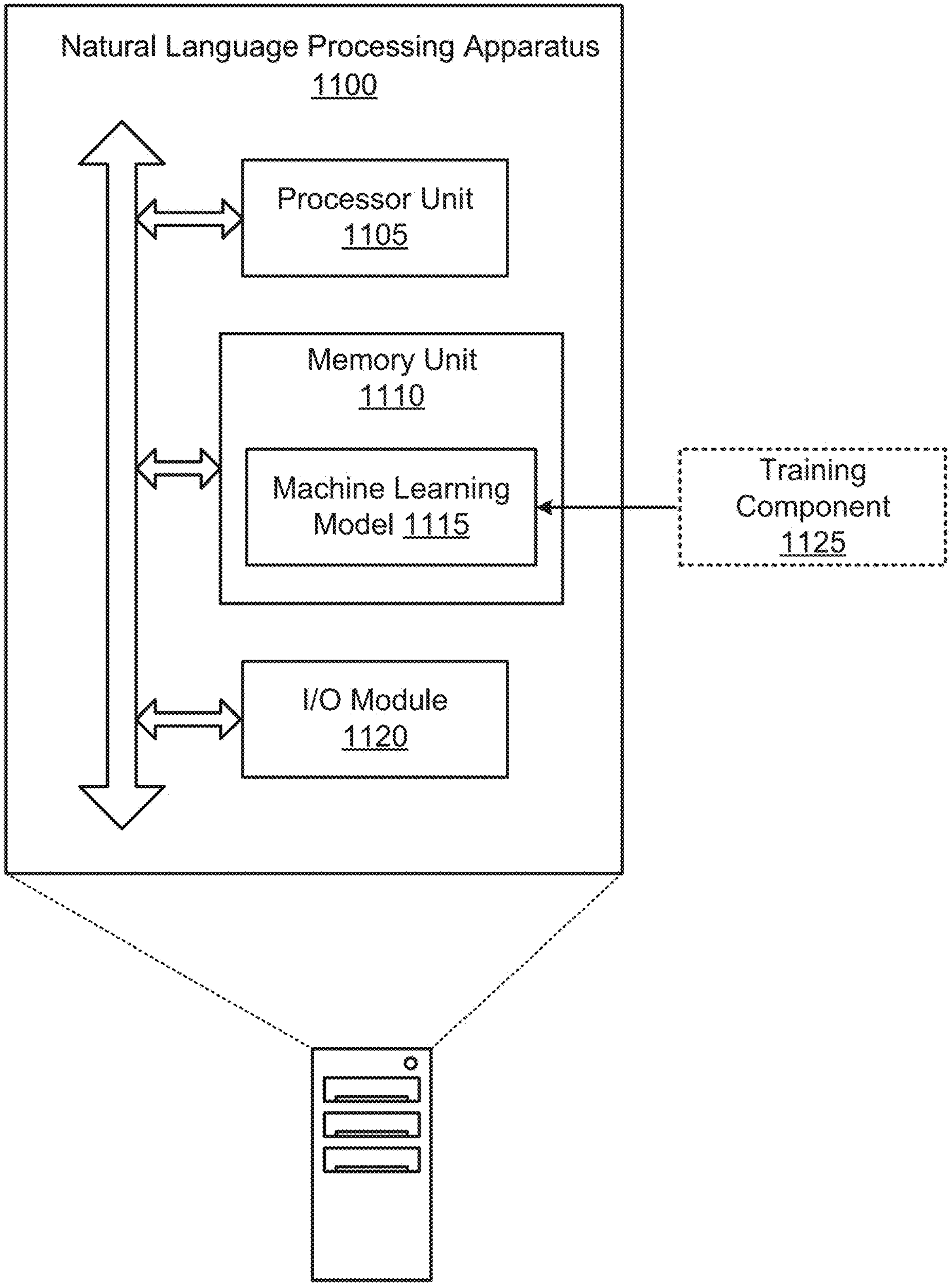
FIG. 11 shows an example of a natural language processing apparatus according to aspects of the present disclosure.
Figure 12:
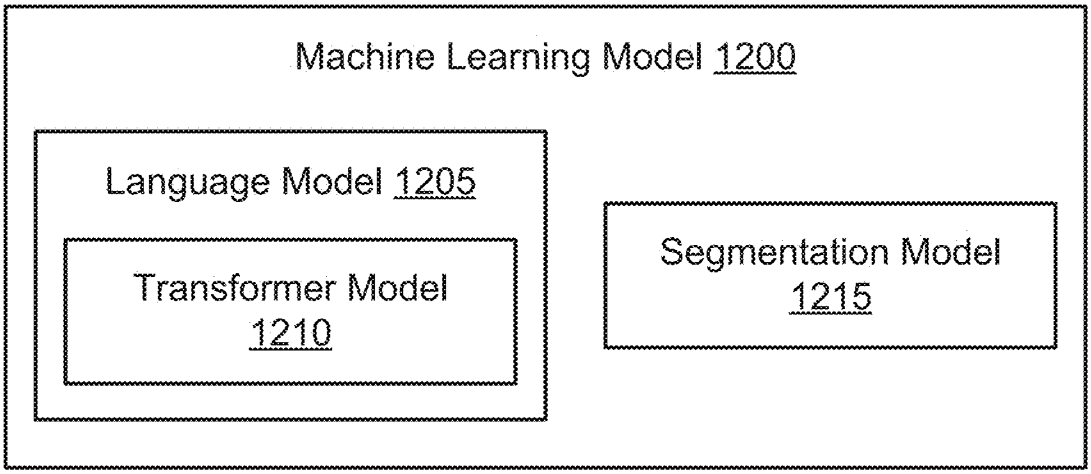
FIG. 12 shows an example of a machine learning model according to aspects of the present disclosure.

In some embodiments, computing device 1000 is an example of, or includes aspects of, the machine learning model of FIGS. 11-12. In some embodiments, computing device 1000 includes one or more processors 1005 that can execute instructions stored in memory subsystem 1010 to perform media generation.

According to some aspects, computing device 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1010 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1015 operates at a boundary between communicating entities (such as computing device 1000, one or more user devices, a cloud, and one or more databases) and channel 1030 and can record and process communications. In some cases, communication interface 1015 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1020 is controlled by an I/O controller to manage input and output signals for computing device 1000. In some cases, I/O interface 1020 manages peripherals not integrated into computing device 1000. In some cases, I/O interface 1020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or via hardware components controlled by the I/O controller.

According to some aspects, user interface component(s) 1025 enable a user to interact with computing device 1000. In some cases, user interface component(s) 1025 include an audio device, such as an external speaker system, an external display device such as a display screen, an input device (e.g., a remote-control device interfaced with a user interface directly or through the I/O controller), or a combination thereof. In some cases, user interface component(s) 1025 include a GUI.

FIG. 11 shows an example of a natural language processing apparatus 1100 according to aspects of the present disclosure. Natural language processing apparatus 1100 is an example of, or includes aspects of, the corresponding element described with reference to FIGS. 1 and 3. In one aspect, natural language processing apparatus 1100 includes processor unit 1105, memory unit 1110, I/O module 1120, and training component 1125. Training component 1125 updates parameters of the machine learning model 1115 stored in memory unit 1110. In some examples, the training component 1125 is located outside the natural language processing apparatus 1100.

According to some aspects, natural language processing apparatus 1100 obtains an input video and a transcript of the input video, where the transcript includes a set of sentences. In some examples, natural language processing apparatus 1100 obtains the transcript including extracting audio data from the input video. In some examples, natural language processing apparatus 1100 generates the transcript based on the audio data.

According to some aspects, natural language processing apparatus 1100 obtains a transcript of an input video, where the transcript includes a set of sentences. According to some aspects, natural language processing apparatus 1100 obtains an input video and a transcript of the input video, where the transcript includes a set of sentences. Natural language processing apparatus 1100 is an example of, or includes aspects of, the corresponding element described with reference to FIGS. 1-4.

According to some aspects, processor unit 1105 comprises a processing device coupled to the memory component. Processor unit 1105 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 1105 is configured to operate a memory array using a memory controller. In other cases, a memory controller is integrated into processor unit 1105. In some cases, processor unit 1105 is configured to execute computer-readable instructions stored in memory unit 1110 to perform various functions. In some aspects, processor unit 1105 includes special purpose components for modem processing, baseband processing, digital signal processing, or transmission processing. According to some aspects, processor unit 1105 comprises one or more processors described with reference to FIG. 10.

Memory unit 1110 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 1105 to perform various functions described herein.

In some cases, memory unit 1110 includes a basic input/output system (BIOS) that controls basic hardware or software operations, such as an interaction with peripheral components or devices. In some cases, memory unit 1110 includes a memory controller that operates memory cells of memory unit 1110. For example, the memory controller may include a row decoder, column decoder, or both. In some cases, memory cells within memory unit 1110 store information in the form of a logical state. According to some aspects, memory unit 1110 is an example of the memory subsystem 1010 described with reference to FIG. 10.

According to some aspects, natural language processing apparatus 1100 uses one or more processors of processor unit 1105 to execute instructions stored in memory unit 1110 to perform functions described herein. For example, the natural language processing apparatus 1100 may obtain an input video and a transcript of the input video, wherein the transcript comprises a plurality of sentences; generate, using a language model, a subset of the plurality of sentences based on the transcript; and generate a video clip based on the input video and a subset of the plurality of sentences, wherein the video clip comprises a portion of the input video.

In one aspect, memory unit 1110 includes machine learning model 1115 trained to obtain an input video and a transcript of the input video, wherein the transcript comprises a plurality of sentences; generate, using a language model, a subset of the plurality of sentences based on the transcript; and generate a video clip based on the input video and a subset of the plurality of sentences, wherein the video clip comprises a portion of the input video. For example, after training, the machine learning model 1115 may perform inferencing operations as described with reference to FIGS. 1-3 to obtain an input video and a transcript of the input video, wherein the transcript comprises a plurality of sentences; generate, using a language model, a subset of the plurality of sentences based on the transcript; and generate a video clip based on the input video and a subset of the plurality of sentences, wherein the video clip comprises a portion of the input video.

In some embodiments, the machine learning model 1115 is an Artificial neural network (ANN) comprising a plurality of networks including the segmentation model described with reference to FIG. 6, the transformer model described with reference to FIG. 5, and the language model described with reference to FIG. 4. An ANN can be a hardware component or a software component that includes connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

ANNs have numerous parameters, including weights and biases associated with each neuron in the network, which control the degree of connection between neurons and influence the neural network's ability to capture complex patterns in data. These parameters, also known as model parameters or model weights, are variables that determine the behavior and characteristics of a machine learning model.

In some cases, the signals between nodes comprise real numbers, and the output of each node is computed by a function of its inputs. For example, nodes may determine their output using other mathematical algorithms, such as selecting the max from the inputs as the output, or any other suitable algorithm for activating the node. Each node and edge are associated with one or more node weights that determine how the signal is processed and transmitted. In some cases, nodes have a threshold below which a signal is not transmitted at all. In some examples, the nodes are aggregated into layers.

The parameters of machine learning model 1115 can be organized into layers. Different layers perform different transformations on their inputs. The initial layer is known as the input layer and the last layer is known as the output layer. In some cases, signals traverse certain layers multiple times. A hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

Training component 1125 may train the machine learning model 1115. For example, parameters of the machine learning model 1115 can be learned or estimated from training data and then used to make predictions or perform tasks based on learned patterns and relationships in the data. In some examples, the parameters are adjusted during the training process to minimize a loss function or maximize a performance metric (e.g., as described with reference to FIG. 11). The goal of the training process may be to find optimal values for the parameters that allow the machine learning model to make accurate predictions or perform well on the given task.

Accordingly, the node weights can be adjusted to improve the accuracy of the output (i.e., by minimizing a loss which corresponds in some way to the difference between the current result and the target result). The weight of an edge increases or decreases the strength of the signal transmitted between nodes. For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning model 1115 can be used to make predictions on new, unseen data (i.e., during inference).

According to some aspects, machine learning model 1115 obtains an input video and a transcript of the input video. In some aspects, the transcript comprises a plurality of sentences and the video clip is generated based on the input video and a subset of the plurality of sentences. In some examples, machine learning model 1115 obtains information indicating a duration of the video clip.

I/O module 1120 receives inputs from and transmits outputs of the natural language processing apparatus 1100 to other devices or users. For example, I/O module 1120 receives inputs for the machine learning model 1115 and transmits outputs of the machine learning model 1115. According to some aspects, I/O module 1120 is an example of the I/O interface 1020 described with reference to FIG. 10.

According to some aspects, training component 1125 trains, using the training data, a language model to generate a subset of the plurality of sentences based on the input transcript. In some examples, training component 1125 trains, using the training data, the language model to generate a video clip based on the input video and a subset of the plurality of sentences, wherein the video clip comprises a portion of the input video. In some examples, training component 1125 computes a loss function based on the ground-truth output. In some examples, training component 1125 updates the parameters of the machine learning model based on the computed loss function.

FIG. 12 shows an example of a machine learning model 1200 according to aspects of the present disclosure. In one aspect, machine learning model 1200 includes language model 1205 and segmentation model 1215.

According to some aspects, language model 1205 generates a subset of the set of sentences based on the transcript. In some examples, language model 1205 generates a video clip based on the input video and a subset of the set of sentences, where the video clip includes a portion of the input video. In some examples, language model 1205 generates the subset of the set of sentences including dividing the set of sentences into one or more input blocks based on a context window of the language model 1205.

In some examples, language model 1205 identifies start times and end times for the set of sentences, where the video clip is generated based on the start times and end times. In some examples, language model 1205 scores the subset of the set of sentences using the language model 1205 to obtain a video clip score, where the video clip is ranked based on the video clip score. In some examples, language model 1205 scores the subset of the set of sentences includes: generating a set of sub-scores for the subset. In some examples, language model 1205 combines the set of sub-scores to obtain the video clip score. In some aspects, the set of sub-scores includes a catchiness score, a standalone score, a humor score, a positivity score, or any combination thereof.

In some examples, language model 1205 generates a set of subsets of the set of sentences. In some examples, language model 1205 scores each of the set of subsets to obtain a set of video clip scores, respectively. In some examples, language model 1205 ranks the set of subsets based on the set of video clip scores to obtain a video clip ranking, where the video clips are sorted based on the video clip ranking. In some examples, language model 1205 determines whether the subset of the set of sentences includes a bias, where the video clip is generated based on the determination.

According to some aspects, language model 1205 generates a video clip based on the input video and the set of subsets of the set of sentences, where the video clip includes a portion of the input video.

According to some aspects, language model 1205 generates a set of sub-scores for each of the set of subsets. In some examples, language model 1205 combines the set of sub-scores to obtain the set of video clip scores.

According to some aspects, language model 1205 processes a subset of the plurality of sentences based on the transcript. In some examples, language model 1205 generates a video clip based on the input video and a subset of the set of sentences, where the video clip includes a portion of the input video. In some aspects, the language model 1205 includes an autoregressive transformer model 1210. In some examples, language model 1205 generates a set of subsets of the set of sentences. In some examples, language model 1205 scores each of the set of subsets to obtain a set of video clip scores, respectively. In some examples, language model 1205 ranks the set of subsets based on the set of video clip scores to obtain a video clip ranking, where the video clip is generated based on the video clip ranking.

In one aspect, language model 1205 includes transformer model 1210. Further details regarding an operation of the transformer model are provided with reference to at least FIG. 5.

According to some aspects, segmentation model 1215 segments the transcript to identify the set of sentences. Further details regarding an operation of the segmentation model are provided with reference to at least FIG. 6.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for video processing, comprising:
obtaining an input prompt, an input video, and a transcript of the input video, wherein the input prompt includes a target duration and the transcript comprises a plurality of sentences;
generating, using a language model, a subset of the plurality of sentences based on the transcript and the target duration, wherein the subset of the plurality of sentences has fewer sentences than the plurality of sentences;
extracting a plurality of video clips from the input video based on the subset of the plurality of sentences;
scoring each of the plurality of video clips based on at least one video aspect by transmitting each of the plurality of video clips to the language model and generating, by the language model, a video clip score; and
selecting a video clip from the plurality of video clips based on the video clip score, wherein the video clip comprises a portion of the input video having the target duration.

2. The method of claim 1, wherein obtaining the transcript comprises:
extracting audio data from the input video; and
generating the transcript based on the audio data.

3. The method of claim 1, further comprising:
segmenting the transcript to identify the plurality of sentences.

4. The method of claim 1, wherein generating the subset of the plurality of sentences comprises:
dividing the plurality of sentences into one or more input blocks based on a context window of the language model.

5. The method of claim 1, wherein generating the subset of the plurality of sentences comprises:
generating an input prompt based on the plurality of sentences; and
providing the input prompt to the language model.

6. The method of claim 1, further comprising:
identifying start times and end times for the plurality of sentences, wherein the video clip is generated based on the start times and end times.

7. The method of claim 1, wherein scoring the subset of the plurality of sentences comprises:
generating a plurality of sub-scores for the subset; and
combining the plurality of sub-scores to obtain the video clip score.

8. The method of claim 7, wherein:
the plurality of sub-scores comprises a catchiness score, a standalone score, a humor score, a positivity score, or any combination thereof.

9. The method of claim 1, further comprising:
generating a plurality of subsets of the plurality of sentences;
scoring each of the plurality of subsets to obtain a plurality of video clip scores, respectively; and
ranking the plurality of subsets based on the plurality of video clip scores to obtain a video clip ranking, wherein the video clips are sorted based on the video clip ranking.

10. The method of claim 1, further comprising:
determining whether the subset of the plurality of sentences comprises a bias, wherein the video clip is generated based on the determination.

11. A non-transitory computer readable medium storing code for video processing, the code comprising instructions that, when executed by at least one processor, cause the at least one processor to perform operations comprising:
obtaining an input prompt, a transcript of an input video, wherein the input prompt includes a target duration and the transcript comprises a plurality of sentences;
generating, using a language model, a plurality of subsets of the plurality of sentences based on the transcript and the target duration, wherein the subset of the plurality of sentences has fewer sentences than the plurality of sentences;
extracting a plurality of video clips from the input video based on the subset of the plurality of sentences;
scoring each of the plurality of video clips based on at least one video aspect by transmitting each of the plurality of video clips to the language model and generating, by the language model, a plurality of video clip scores, respectively; and
ranking, using the language model, the plurality of subsets based on the plurality of video clip scores to obtain a video clip ranking.

12. The non-transitory computer readable medium of claim 11, the code further comprising instructions that, when executed by the at least one processor, cause the at least one processor to perform operations comprising:
selecting a video clip from the plurality of video clips based on the video clip ranking, wherein the video clip comprises a portion of the input video having the target duration.

13. The non-transitory computer readable medium of claim 11, the code further comprising instructions that, when executed by the at least one processor, cause the at least one processor to perform operations comprising:
segmenting the transcript to identify the plurality of sentences.

14. The non-transitory computer readable medium of claim 11, wherein generating the subset of the plurality of sentences comprises:

generating an input prompt based on the plurality of sentences; and providing the input prompt to the language model.

15. The non-transitory computer readable medium of claim 11, wherein scoring each of the plurality of subsets comprises:

generating a plurality of sub-scores for each of the plurality of subsets; and combining the plurality of sub-scores to obtain the plurality of video clip scores.

16. A system comprising:

a memory component; and a processing device coupled to the memory component, the processing device configured to perform operations comprising:

obtaining an input prompt, an input video, and a transcript of the input video, wherein the input prompt includes a target duration and the transcript comprises a plurality of sentences;

generating, using a language model, a subset of the plurality of sentences based on the transcript and the target duration, wherein the subset of the plurality of sentences has fewer sentences than the plurality of sentences;

extracting a plurality of video clips from the input video based on the subset of the plurality of sentences;

scoring each of the plurality of video clips based on at least one video aspect by transmitting each of the plurality of video clips to the language model and generating, by the language model, a video clip score; and selecting a video clip from the plurality of video clips based on the video clip score, wherein the video clip comprises a portion of the input video having the target duration.

17. The system of claim 16, wherein:

the language model comprises an autoregressive transformer model.

18. The system of claim 16, further comprising:

a segmentation model configured to segment the transcript to identify the plurality of sentences.

19. The system of claim 16, wherein the processing device is further configured to perform operations comprising:

generating a plurality of subsets of the plurality of sentences;

scoring each of the plurality of subsets to obtain a plurality of video clip scores, respectively; and ranking the plurality of subsets based on the plurality of video clip scores to obtain a video clip ranking, wherein the video clip is generated based on the video clip ranking.

* * * * *